(12) United States Patent
Leong et al.

(10) Patent No.: US 11,975,427 B2
(45) Date of Patent: May 7, 2024

(54) METHOD FOR CONTROLLING AN ELECTRIC MOTOR OF A POWER TOOL

(71) Applicant: Robert Bosch GmbH, Stuttgart (DE)

(72) Inventors: Chi Hoe Leong, Penang Island (MY); Ju-Lien Tan, Gelugor Penang (MY); Kah Hooi Tan, Pulau Pinang (MY); Moritz Stiefel, Filderstadt (DE); Sim Teik Yeoh, Gelugor Penang (MY)

(73) Assignee: ROBERT BOSCH GMBH, Stuttgart (DE)

( * ) Notice: Subject to any disclaimer, the term of this patent is extended or adjusted under 35 U.S.C. 154(b) by 3 days.

(21) Appl. No.: 17/826,871

(22) Filed: May 27, 2022

(65) Prior Publication Data

US 2022/0281086 A1    Sep. 8, 2022

Related U.S. Application Data

(62) Division of application No. 15/312,715, filed as application No. PCT/EP2015/063706 on Jun. 18, 2015, now Pat. No. 11,491,617.

(30) Foreign Application Priority Data

Jun. 20, 2014   (DE) .................... 10 2014 211 894.8
Jun. 17, 2015   (DE) .................... 10 2015 211 119.9

(51) Int. Cl.
   B25B 21/00    (2006.01)
   B25B 21/02    (2006.01)
   (Continued)

(52) U.S. Cl.
   CPC ...... *B25B 23/1475* (2013.01); *B25B 23/0064* (2013.01); *B25F 5/00* (2013.01)

(58) Field of Classification Search
   CPC .... B25B 23/0064; B25B 23/1475; B25F 5/00
   See application file for complete search history.

(56) References Cited

U.S. PATENT DOCUMENTS 3,939,920 A    2/1976  Hardiman et al.
5,587,931 A   12/1996  Jones et al.
            (Continued)

FOREIGN PATENT DOCUMENTS

EP    1136188 A2    9/2001
EP    1510299 A2    3/2005
            (Continued)

OTHER PUBLICATIONS

International Search Report dated Jan. 29, 2016, of the corresponding International Application PCT/EP/063706 filed Jun. 18, 2015.

*Primary Examiner* — Thanh K Truong
*Assistant Examiner* — David G Shutty
(74) *Attorney, Agent, or Firm* — NORTON ROSE FULBRIGHT US LLP; Gerard A. Messina

(57) ABSTRACT

A method for controlling an electric motor of a power tool having a receptacle for a tool, at least a current of the electric motor and/or a rotation speed of the electric motor during an impact operating mode of the electric motor being detected as a parameter, a driving time of the electric motor for the impact operating mode being specified as a function of the detected parameter. A method is also described for controlling an electric motor of a power tool having a receptacle for a tool for unscrewing a screw from a mating part.

9 Claims, 11 Drawing Sheets

(51) Int. Cl.
  *B25B 23/00* (2006.01)
  *B25B 23/147* (2006.01)
  *B25F 5/00* (2006.01)

(56) References Cited

U.S. PATENT DOCUMENTS

| | | | |
|---|---|---|---|
| 6,311,786 B1 | 11/2001 | Giardino et al. | |
| 6,546,815 B2 * | 4/2003 | Yamada | B25B 21/02 73/862.21 |
| 7,969,116 B2 | 6/2011 | Aradachi et al. | |
| 8,678,106 B2 * | 3/2014 | Matsunaga | B25B 21/008 173/183 |
| 2002/0020538 A1 | 2/2002 | Giardino | |
| 2002/0050364 A1 | 5/2002 | Suzuki et al. | |
| 2002/0134172 A1 | 9/2002 | Yamada et al. | |
| 2005/0109519 A1 | 5/2005 | Kawai et al. | |
| 2006/0185869 A1 | 8/2006 | Arimura | |
| 2008/0289839 A1 | 11/2008 | Hricko et al. | |
| 2010/0096155 A1 | 4/2010 | Iwata et al. | |
| 2010/0252287 A1 | 10/2010 | Morimura et al. | |
| 2011/0114346 A1 | 5/2011 | Suzuki et al. | |
| 2012/0279736 A1 | 11/2012 | Tanimoto et al. | |
| 2012/0318550 A1 | 12/2012 | Tanimoto et al. | |
| 2013/0008679 A1 | 1/2013 | Nishikawa et al. | |
| 2013/0025892 A1 * | 1/2013 | Mashiko | B25B 21/026 173/2 |
| 2013/0062086 A1 * | 3/2013 | Ito | B25B 23/1475 173/1 |
| 2013/0133911 A1 | 5/2013 | Ishikawa et al. | |
| 2013/0284480 A1 | 10/2013 | Horie et al. | |
| 2014/0158390 A1 | 6/2014 | Mashiko et al. | |
| 2014/0374130 A1 | 12/2014 | Nakamura et al. | |
| 2016/0046035 A1 | 2/2016 | Laghate et al. | |
| 2017/0008156 A1 | 1/2017 | Miyazaki et al. | |
| 2017/0190032 A1 * | 7/2017 | Leong | B25F 5/00 |
| 2018/0200872 A1 | 7/2018 | Leong | |

FOREIGN PATENT DOCUMENTS

| | | | |
|---|---|---|---|
| EP | 1695794 A2 | 8/2006 | |
| EP | 1769887 A1 * | 4/2007 | B25B 21/02 |
| EP | 2599589 A1 | 6/2013 | |
| JP | 2807036 B2 * | 4/1990 | |
| JP | H1080828 A | 3/1998 | |
| JP | 2001129768 A | 5/2001 | |
| JP | 2007001013 A | 1/2007 | |
| JP | 2009262273 A | 11/2009 | |
| WO | 2008134358 A1 | 11/2008 | |
| WO | 2011013853 A2 | 2/2011 | |
| WO | 2011122361 A1 | 10/2011 | |
| WO | 2013012098 A1 | 1/2013 | |

* cited by examiner

METHOD FOR CONTROLLING AN ELECTRIC MOTOR OF A POWER TOOL

CROSS REFERENCE

The present application is a divisional application of U.S. application Ser. No. 15/312,715, filed Nov. 21, 2016, which is a U.S. National Phase of International Application No. PCT/EP2015/063706, filed Jun. 18, 2015, which claims the benefit under 35 U.S.C. § 119 of German Patent Application No. DE 10 2015 211 119.9, filed on Jun. 17, 2015, and German Patent Application No. DE 10 2014 211 894.8, filed on Jun. 20, 2014, which are all expressly incorporated herein by reference in their entireties.

FIELD

The present invention relates to a method for controlling an electric motor of a power tool, and to a control device.

BACKGROUND INFORMATION

Conventionally, an electric motor of a power tool is controlled as a function of an actuation of a switch. In this context, control is applied to the electric motor, for example, with a predefined rotation speed or with a predefined torque.

An object of the invention is to furnish an improved method for controlling the electric motor, an improved control device, and an improved power tool.

SUMMARY

An advantage of the example method according to the present invention described herein is that at least a current of the electric motor and/or a rotation speed of the electric motor during an impact operating mode of the electric motor is detected as a parameter, and a driving time of the electric motor for the impact operating mode is specified as a function of the detected parameter. Improved control application to the electric motor, adapted to the particular tool, is thereby achieved. The operability of the power tool is thereby simplified.

In a further embodiment the electric motor is operated for the specified driving time in the impact operating mode, and after the driving time at least a torque of the electric motor or a rotation speed of the electric motor is reduced. A clutch can be used to reduce the torque at the drive system, or the electric motor is shut off. For example, the electrical voltage that is supplied to the electric motor is correspondingly reduced.

In an embodiment, a torque and/or a rotation speed with which the electric motor is driven during the impact operating mode can be specified as a function of the detected parameter. Improved utilization of the power tool is thereby achieved.

A standard deviation of the current of the electric motor and/or of the rotation speed of the electric motor during an impact operating mode of the electric motor is preferably detected as a parameter.

In an embodiment, a calculation method and/or a table and/or a characteristic curve is used to specify, as a function of the parameter, the control application time and/or the torque and/or the rotation speed for control application to the electric motor.

In a further embodiment, the electric motor is supplied with power using a battery, a voltage of the battery being ascertained, the parameter being weighted with the ascertained battery voltage, in particular if the battery voltage is below a limit value. A drop in the voltage of the battery can thereby be compensated for by the weighting of the parameter.

In a further embodiment, the battery voltage and the driving time are corrected as a function of the measured battery voltage. In a further embodiment the battery voltage is detected and compared with a reference value, and the driving time is corrected as a function of a ratio between the measured battery voltage and the reference value. The variable for control application to the electric motor is thereby compensated for in the context of a variable battery voltage. Driving of the electric motor is thereby made more precise.

In a further embodiment, a notification is outputted to an operator if a measured battery voltage falls below a predefined limit. This ensures that the operator is notified of the low battery voltage and of the low drive performance, associated therewith, of the power tool. The notification can furthermore contain the information that a predefined driving time should be adapted because of the low battery voltage. In a context of definition of the driving time by the operator, the operator has the capability, based on the notification, of adapting the driving time if the battery voltage is changing too much or is decreasing below a predefined limit.

In a further embodiment, the driving time for an impact operating mode is inputted by an operator. The driving time is stored, and is taken into consideration by the control circuit upon control application to the electric motor. This embodiment offers the advantage that the driving time does not need to be ascertained automatically, but instead the operator can easily specify the driving time. The "driving time" refers to a time during which a screw is driven into a workpiece during an impact driving mode before the torque of the electric motor is reduced, a clutch is opened, or the electric motor is completely shut off. Damage to the tool, in particular to the screw, can thereby be avoided. The workpiece can furthermore be protected from damage by avoiding excessively deep driving of the screw. In particular, tightening of the screw in the workpiece can be improved by the fact that slippage of the screw thread in the workpiece is avoided by defining the driving time during the impact operating mode.

In a further embodiment, the electric motor is stopped in the context of unscrewing a screw when the torque falls below a predefined value. The excessively low torque indicates a loosened screw. The result thereby achieved is that the loosened screw is not completely unscrewed from the workpiece but instead remains inserted in the workpiece. This lowers the risk of losing the screw.

In an embodiment, the delivered torque is detected on the basis of a value of a current that is consumed by the electric motor, the electric motor being stopped when the value of the current falls below a predefined limit value. The low current consumption indicates that the screw can easily be rotated, i.e. is only loosely seated.

In an embodiment, the electric motor is stopped in the context of unscrewing a screw when the screw has been unscrewed a predefined number of revolutions out of a seated position after an activation of the electric motor. Preferably the number of revolutions can be specified by an operator, for example by way of an input. This additionally lowers the risk of losing the screw in the context of unscrewing. The handling of the power tool is furthermore improved.

A further embodiment relates to a method for controlling an electric motor of a power tool having a receptacle for a tool for unscrewing a screw from a mating part, different control methods for unscrewing the screw or the workpiece being used as a function of a seating torque of the screw.

In a further embodiment, different control methods for unscrewing the screw are selected as a function of a rotation speed of the electric motor predefined by an operator, and/or as a function of an actuation speed of a switch for specifying the rotation speed.

In a further embodiment, control is applied to the electric motor in a first phase in accordance with a predefined rotation speed; the current of the electric motor being detected during the first phase; the detected current being compared with a limit value; upon exceedance of the limit value, the electric motor having control applied to it during a subsequent second phase with a predefined second rotation speed; the current of the electric motor being detected during the second phase; a disengaged screw being recognized as a function of the detected current of the second phase, and the rotation speed of the electric motor being at least reduced or stopped; and the limit value depending on the seating torque and/or on the rotation speed predefined by the operator.

In an embodiment, control is applied to the electric motor in a first phase in accordance with a rotation speed predefined by an operator; a time span during which the electric motor remains in the first phase being detected in particular with the aid of a counter; upon exceedance of a predefined time span, in particular of a counter status, the electric motor having control applied to it during a subsequent second phase with a predefined second rotation speed, in particular with a maximum rotation speed; the current of the electric motor being detected during the second phase; a disengaged screw being recognized as a function of the detected current of the electric motor during the second phase, and the rotation speed of the electric motor at least being reduced or the electric motor being stopped.

In a further embodiment, a disengaged screw is recognized as a function of a current falling below a predefined limit value and/or as a function of a predefined negative time-related gradient of the current being exceeded, and the rotation speed of the electric motor at least is reduced or the electric motor is stopped.

In a further embodiment, the seating torque of the screw is estimated on the basis of the current that is consumed by the electric motor.

The methods described can also be applied to the unscrewing of threaded bolts or nuts or other threaded parts.

The present invention is explained in further detail below with reference to the Figures.

DETAILED DESCRIPTION OF EXAMPLE EMBODIMENTS

Figure 1:
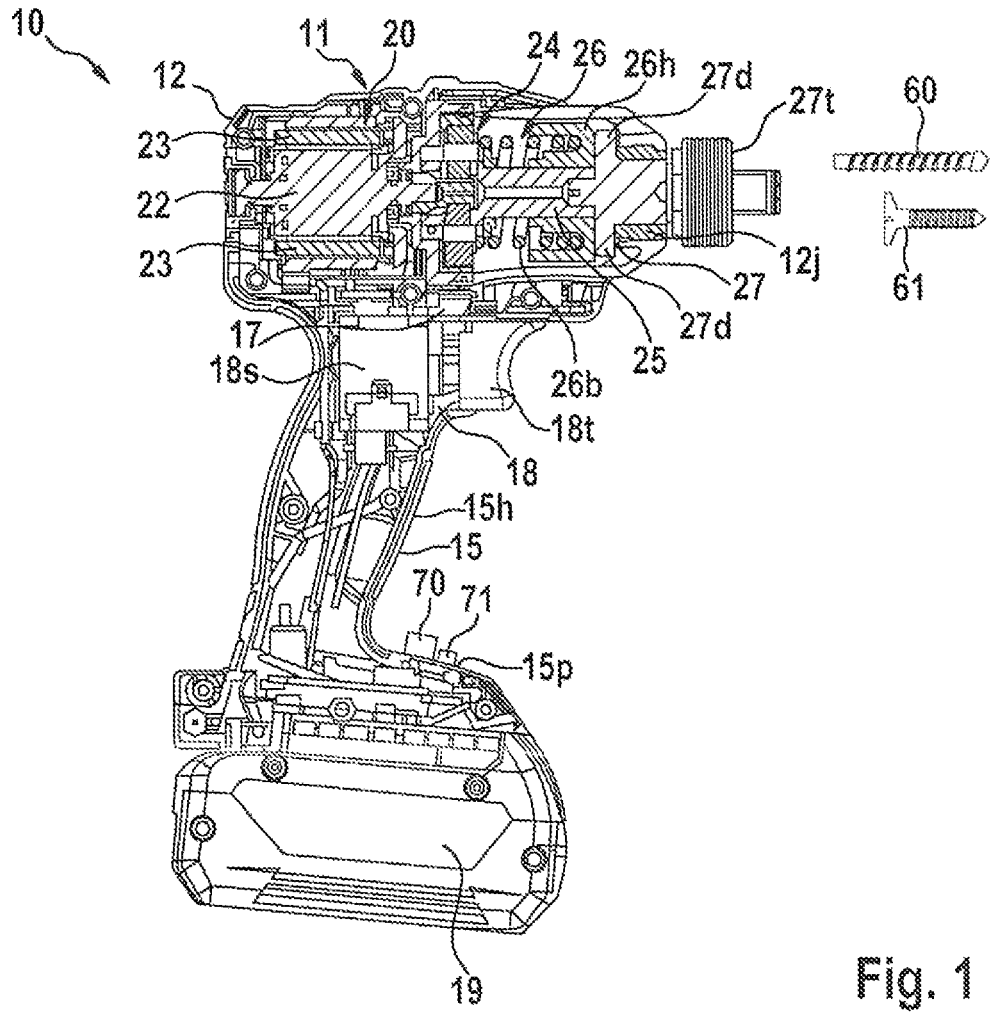
FIG. 1 is a schematic cross section through a power tool.

FIG. 1 schematically depicts a power tool 10 that is embodied in the form of an impact driver 10. Impact driver 10 has a housing 11 that has a cylindrical main body 12 and a handle 15 attached thereto. A battery 19 is disposed oppositely to main body 12. Disposed in main body 12 is an electric motor 20 in the form of a brushless DC motor 20 having a planetary gearbox 24, a spindle 25, an impact generating mechanism 26, and an anvil 27. Electric motor 20 serves as a drive source for the rotating impact generating mechanism 26. The rotation speed of electric motor 20 is reduced with the aid of planetary gearbox 24 and then transferred to spindle 25. The rotational force of spindle 25 is converted into a rotating impact force by impact generating mechanism 26, a hammer 26h and a compression spring 26b being provided for that purpose. An impact force of hammer 26h is transferred to anvil 27. Anvil 27 is mounted rotatably around an axis and is driven by the rotational impact force of hammer 26h. Anvil 27 is held by a bearing 12j rotatably in housing 11, which is disposed on a front side of main body 12. Anvil 27 can thus rotate around the rotation axis but cannot move along the rotation axis. Provided on a front side of anvil 27 is a receptacle 27t for receiving, for example, a drill bit 60 or, via an insert, a screw 61. Drill bit 60 or screw 61 represent the tool that is driven by the power tool.

Handle 15 of housing 11 is grasped by an operator in order to use power tool 10. The handle has a holding portion 15h and a lower end portion 15p that adjoins the lower end of handle portion 15h. Battery 19, which supplies power tool 10 with power, is provided on lower end portion 15p. Provided on handle portion 15h is a main switch 18 which has a trigger 18t that can be actuated with a finger. Main switch 18 furthermore has a switch unit 18s that is used to switch the power tool on or off. Trigger 18t is used to increase a variable for control application to electric motor 20 as a function of the actuation travel of trigger 18t. The trigger represents a switch for defining the rotation speed of the electric motor. The actuation travel of trigger 18t is detected, for example, with the aid of switch unit 18s, for example as a resistance value, and is reported to a control circuit (46, FIG. 3). If the resistance value of switch unit 18s of main switch 18 changes in accordance with the retraction state of trigger switch 18t, the control circuit (46, FIG. 3) then, for example, adapts a rotation speed of the control application to electric motor 20. The rotation speed and/or the torque of electric motor 20 can thereby be controlled.

Also provided, above main switch 18, is a direction switch 17 that specifies the rotation direction of receptacle 27t as a function of a position. Direction switch 17 can be configured as a slide switch or as a rotary switch. With direction switch 17 in a first position, upon simultaneous actuation of main switch 18 the power tool 10 rotates clockwise to the right, i.e., in normal mode, for example to screw in a screw. With direction switch 17 in a second position and upon simultaneous actuation of main switch 18, power tool 10 rotates to the left, i.e., counter-clockwise, in an unscrewing mode or disengaging mode in order to unscrew or disengage a screw.

The power tool can furthermore have a switch 70. Switch 70 can be embodied as a rotary switch or slide switch. The position of switch 70 is reported to the control circuit (46, FIG. 3). With switch 70 in a first position, in the context of unscrewing of a screw, i.e., with direction switch 17 in a second position and upon actuation of main switch 18, a method for disengaging a screw is carried out, in which method the unscrewing of the screw is influenced as a function of at least one parameter. In particular, an automatic method is carried out in which a desired disengaged state of the screw is to be achieved. In particular, the screw is not to be completely released from the screw connection, so that the screw, for example, does not become lost. Depending on the embodiment selected, an indicator 71 can be provided which indicates whether the automatic method for unscrewing a screw is activated. The indicator can be configured in the form of a lamp or an LED. The indicator can, for example, be integrated into switch 70.

If, in the context of disengaging or unscrewing a screw, a. In addition, with switch 70 in a first position, an automatic method for disengaging a screw.

Figure 2:
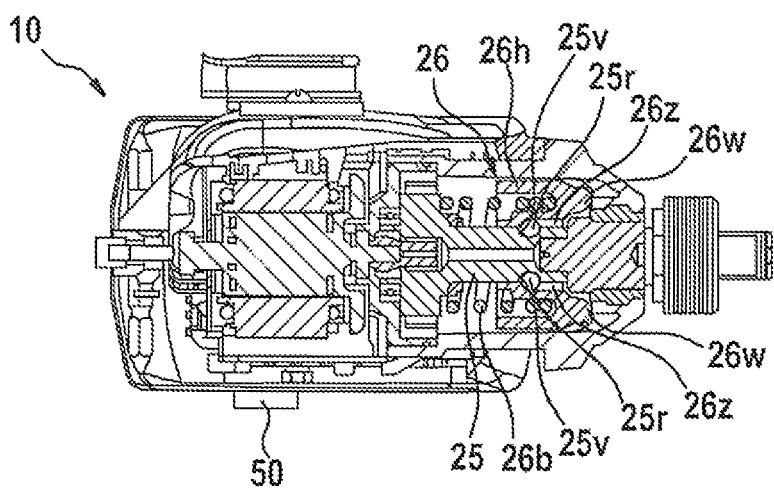
FIG. 2 is a second cross section through the power tool.

FIG. 2 is a further cross section showing further details of power tool 10. Hammer 26h of impact generating mechanism 26 is connected to spindle 25 via V-shaped first guidance grooves 25v, V-shaped second guidance grooves 26z, and steel balls 25r. First guidance grooves 25v are disposed on a front side of spindle 25 on the outer surface, first guidance grooves 25v having semicircular portions that are directed with the V-shaped openings outward. In addition, the V-shaped second guidance grooves 26z are disposed in an inner surrounding surface of hammer 26h oppositely to first guidance grooves 25v of spindle 25. Second guidance grooves 26z have a semicircular cross section, the grooves being open in a forward direction. Steel balls 25r are disposed between first guidance grooves 25v and second guidance grooves 26z. The result is that hammer 26h is mounted rotatably through a predefined angle with respect to a reference position of spindle 25, and is capable of moving in an axial direction with respect to a longitudinal axis of spindle 25. Compression spring 26b is furthermore in contact with the outer surface of spindle 25 and with hammer 26h, so that hammer 26h is preloaded toward spindle 25.

Impact projections 26w are configured at a front end surface of hammer 26h in order to generate impacts onto anvil 27 at two points offset 180° from one another. Anvil 27 is furthermore configured, at the two points offset 180° in a circumferential direction, with impact arms 27d (FIG. 2) that receive the impacts of impact projections 26w of hammer 26h. Hammer 26h is held on spindle 25 by the preload force of compression spring 26b, so that impact projections 26w of hammer 26h abut against impact arms 27d of anvil 27. In this state, hammer 26h then rotates together with spindle 25 when spindle 25 is rotated by electric motor 20, and the rotational force of hammer 26h is transferred to anvil 27 via impact projections 26w and impact arms 27d. In this fashion, for example, a screw can be inserted into a workpiece in an impact operating mode.

Upon insertion, the screw can reach a position in the workpiece at which a screwing-in resistance exceeds the torque of hammer 26h. The screwing-in resistance is transferred to anvil 27 as a torque. The result is that hammer 26h is offset back from the spindle against the preload force of compression spring 26b, and impact projections 26w of the hammer ride over impact arms 27d of anvil 27. Impact projections 26w are thereby released from abutment against impact arms 27d, so that impact projections 26w can rotate freely through a specified angle. When impact projections 26w of hammer 26h move over impact arms 27d of anvil 27, the hammer then accelerates its rotary motion. As a result of the preload force of compression spring 26b, hammer 26h is pushed back toward anvil 27 within the specified angle so that impact projections 26w of the hammer once again come into contact with impact arms 27d of anvil 27. As a result of the impact of impact projections 26w onto impact arms 27d, an elevated torque is exerted on anvil 27 and thus on receptacle 27t as well as screw 61 or drill bit 60. This process is continuously repeated during the impact operating mode.

Power tool 10 can furthermore have an input unit 50 with which a user of the power tool can input, for example, the maximum operating time for the electric motor, in particular the maximum operating time of the electric motor for an impact operating mode. A user can furthermore input a parameter for a size of the tool, in particular a diameter for a screw or a drill bit. Input unit 50 is connected to the electronic control circuit (46, FIG. 3) and/or to a memory (51, FIG. 3).

Figure 3:
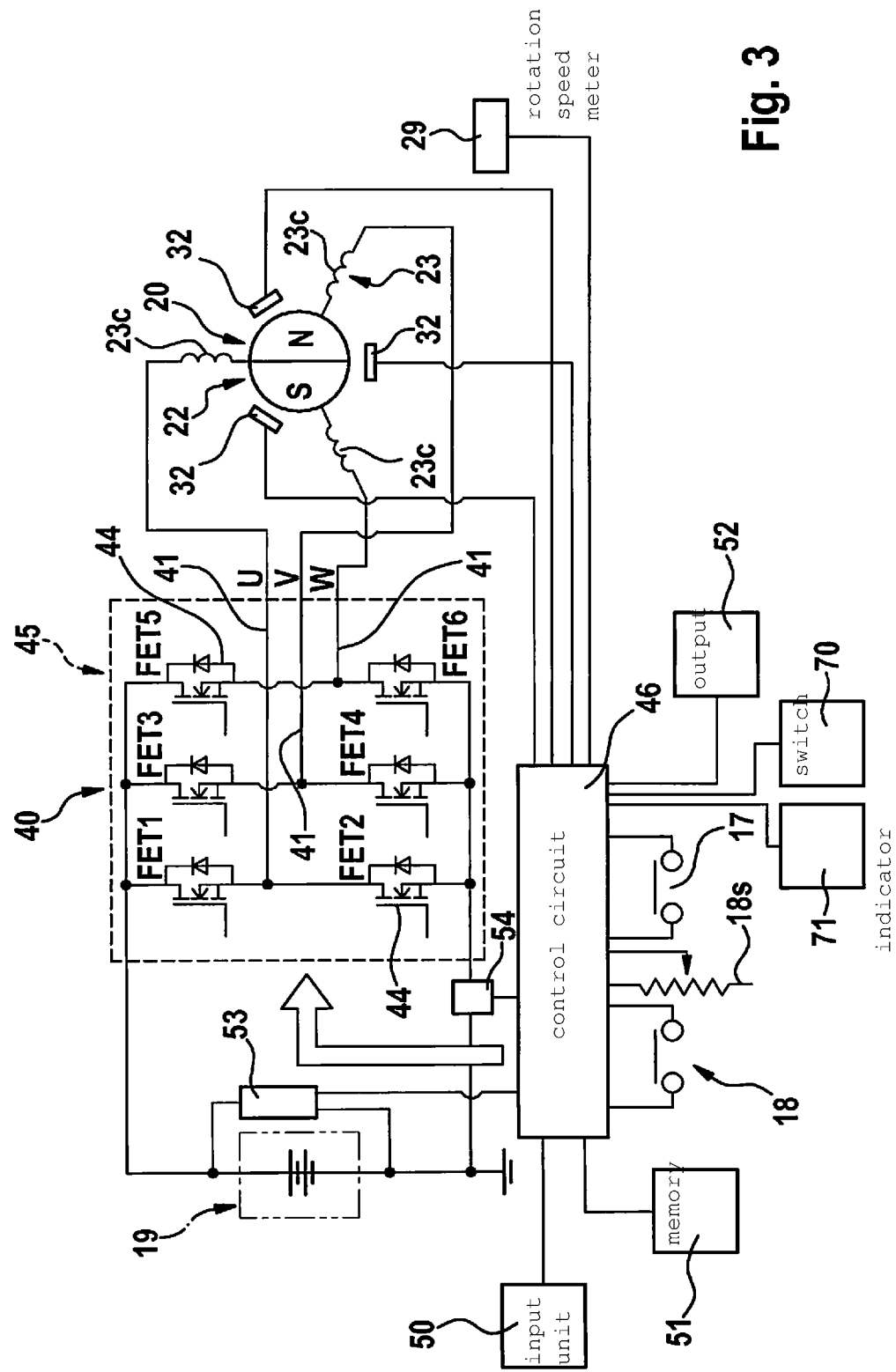
FIG. 3 schematically depicts a circuit assemblage for driving an electric motor of a power tool.

FIG. 3 schematically depicts a circuit assemblage of power tool 10 of FIG. 1 for applying control to electric motor 20, which is configured e.g. as a brushless DC motor and is driven by a control application circuit 40. Electric motor 20 has a rotor 22 having permanent magnets, and a stator 23 having drive coils 23C. Control application circuit 40 is an electrical circuit for applying control to electric motor 20, and has a three-phase bridge circuit 45 that has six switching elements 44, for example in the form of field effect transistors. Also provided is a control circuit 46 that applies control to switching elements 44 of three-phase bridge circuit 45 as a function of switch unit 18s.

Three-phase bridge circuit 45 has three output leads 41 that are connected to the corresponding control coils 23c of electric motor 20. Control circuit 46 is configured to apply control to switch elements 44, based on signals of magnetic sensors 32, in such a way that an electric current flows sequentially through drive coils 23c in order to rotate rotor 22 at a desired rotation speed and/or with a desired torque. Control circuit 46 can furthermore measure a rotation speed of electric motor 20 with the aid of magnetic sensors 32. Control circuit 46 is furthermore connected to a measuring device 53 that detects the charge state of battery 19, in particular the voltage of battery 19, and conveys it to control circuit 46. Control circuit 46 is connected to switch 70.

The power tool furthermore has an input unit 50 with which a user of the power tool can input, for example, the maximum driving time for an impact operating mode and/or a size, in particular a diameter, for a screw or a drill bit. Input unit 50 is connected to electronic control circuit 46. Electronic control circuit 46 is furthermore connected to a memory 51. Data, characteristic curves, characteristics diagrams, and/or calculation methods are stored in memory 51. The power tool also possesses an output 52 by way of which a signal can be delivered to the user, in particular a warning signal regarding an excessively low charge state of the battery. A limit value for the charge state of the battery is stored for this purpose in memory 51. Control circuit 46 detects the present voltage of battery 19 with the aid of measuring device 53, and compares the measured voltage with the limit value. If the charge state of battery 19 falls below the limit value, control circuit 46 then optically, acoustically, and/or haptically outputs a corresponding notification via output 52. The user can furthermore shut off automated operation of electric motor 20 by way of a corresponding input.

Control circuit 46 can furthermore detect a type of battery 19, which is communicated, e.g., via a code on the battery, for example with the aid of a sensor, in particular with the aid of an optical sensor. The type of battery 19 identifies the battery voltage that corresponds to a sufficient charge state. Corresponding limit values for the voltage that corresponds to a sufficient charge of battery 19 for normal operation, in particular for an impact operating mode, can be stored in memory 51 for various codes or battery types. In order to identify the charge state, control circuit 46 measures the charge voltage of battery 19 with the aid of measuring device 53 and compares that voltage with stored limit values. The battery type can preferably be taken into consideration in this context in order to read out from memory 51 precise limit values for a sufficient charge state of battery 19. Control circuit 46 can furthermore measure the current of electric motor 20 with a current meter 54, and/or the rotation speed of electric motor 20 with a rotation speed meter 29. The current and/or the rotation speed can be used by control circuit 46 to determine when an impact operating mode of the power tool begins. Corresponding thresholds or limit values for the current of the electric motor and the rotation speed of the electric motor, which values electric motor 20 exceeds when an impact operating mode starts, are stored for that purpose in memory 51. Control circuit 46 is configured to determine a driving time for an impact operating mode as a function of a detected parameter of the electric motor, in particular as a function of the current and/or of the rotation speed. The charge state of the battery is preferably also taken into consideration in that context. A characteristics diagram, a characteristic curve, a table, or a corresponding calculation method is used to determine the driving time. The characteristics diagram, the characteristic curve, the table, or the calculation method determine a correlation between the current and/or rotation speed and the driving time. At the end of the driving time, i.e. at the end of the impact operating mode, electric motor 20 is stopped by control circuit 46 or an electronic clutch is activated for a short period of time and then the electric motor is completely stopped. The ascertained parameter for the size of the tool, in particular the diameter of the drill bit and/or of the screw, is stored in the memory and is used for further drilling or screwdriving operations of control circuit 46.

In a first embodiment that is explained with reference to a first program sequence of FIG. 4, control circuit 46 ascertains at the beginning of an impact operating mode, preferably within a predefined first time span, a parameter that depends on a size of the tool, in particular on a diameter of a screw or of a drill bit. The first time span can extend from a start of the impact operating mode to, for example, 100 or 200 milliseconds or more after the start of the impact operating mode. The current and/or rotation speed of the electric motor, for example, is measured as a parameter at specific time intervals during the first time span. The measured values for the current of the electric motor and/or the values for the rotation speed of the electric motor are preferably filtered in order to remove undesired erroneous data. The rotation speed and/or the current are used to ascertain on the basis of tables a variable, in particular a driving time, for control application to the electric motor. Instead of a table, another calculation method and/or a characteristic curve can also be used in order to ascertain the variable for control application to the electric motor.

The variable for control application to the electric motor can also be ascertained using two further approaches. A first calculation approach ascertains a standard deviation of the measured values for the current, and/or a standard deviation of the measured values for the rotation speed, during the first time span during a control application to the electric motor, in particular during the first 200 milliseconds after an impact operating mode of electric motor 20 begins.

The standard deviation can be calculated using the following formulas:

The standard deviation $\sigma_X$ of a random variable X is defined as the square root of the variance Var(X):

$$\sigma_X := \sqrt{\text{Var}(X)}.$$

The variance $$\text{Var}(X) = E((X - E(X))^2) = E(X^2) - (E(X))^2$$

of X is always greater than or equal to 0. The symbol $E_{(.)}$ identifies the expected value.

With a second type of calculation the first time span is subdivided into a predefined number of sub-intervals, for example into ten sub-intervals. Then a standard deviation is calculated, for each sub-interval, for the measured values for the current and/or for the rotation speed. An averaged standard deviation for the current and/or an averaged standard deviation for the rotation speed is then ascertained, by averaging, from the ten standard deviations for the current and/or for the rotation speed.

The standard deviation and/or the averaged standard deviation of the rotation speed and/or of the current are used to ascertain, based on tables, a variable for control application to the electric motor. Instead of a table, a different calculation method and/or a characteristic curve can also be used to ascertain the variable for control application to the electric motor.

The variable can be, for example, a driving time for control application to the electric motor. The driving time can specify, for example, the time for which the electric motor is driven when the button is pressed in order to screw in a screw. After the driving time, the voltage supply to electric motor 20 is reduced or discontinued. The driving time is the time for which the electric motor is driven, during an impact operating mode of the power tool, in particular in order to screw a screw into a workpiece. The variable for control application to the electric motor can also relate to a maximum rotation speed and/or a maximum torque and/or a maximum current.

The program starts at program point 400. At a subsequent program point 410 a check is made as to whether the rotation speed n is above a predefined limit value W and whether the current i is above a predefined limit value I. If both conditions are not satisfied, execution then cycles again through program point 410. If the result of the query is that the rotation speed n is higher than the limit value W and that the current i of the electric motor is higher than the limit value I, execution then branches to program point 420. The query at program point 410 checks whether the power tool is already in a specified operating state, e.g., in the impact operating mode in which the hammer repeatedly strikes the anvil. Corresponding limit values W, I are specified for the rotation speed and current, and are stored in memory 51. Once the predefined operating state has been recognized, the driving time for control application to the electric motor, in particular for an impact operating mode of the electric motor, is started.

A check can be made as to whether an impact operating mode exists, for example, by the fact that a time span between two impacts of the impact operating mode is less than a first limit value. The first limit value can be in the range between 0.01 second and 0.05 second. The first limit value is stored in memory 51. The impacts can be detected, for example, acoustically based on acoustic sensors or can be ascertained based on the change over time in the current through the electric motor. It is also possible to check whether a standard deviation of the measured rotation speed is less than a second limit value. The second limit value can be in the range between 30 and 90. The second limit value is stored in memory 51. If both conditions are satisfied, an impact operating mode of the power tool is unequivocally recognized. The limit values are ascertained experimentally and can vary from one power tool to another, for example depending on the nature of the electric motor.

In addition, execution branches preferably automatically from program point 410 to program point 420 if a predefined first time span since operation of the electric motor, in particular since the beginning of the impact operating mode of the power tool, has elapsed, even if the conditions of program point 410 are not satisfied.

At program point 420, at least one parameter of the electric motor is ascertained, as a function of the measured values for the current and/or the measured values for the rotation speed of the electric motor, during a first time span in program point 420. For example, the current and/or rotation speed of the electric motor is measured as a parameter at specified time intervals during the first time span. The first time span can extend, for example, from a start of the impact operating mode to 200 milliseconds after the start of the impact operating mode. The ascertained current and/or ascertained rotation speed, and/or the standard deviation of the rotation speed and/or of the current, and/or the averaged standard deviation of the rotation speed and/or of the current, are calculated as described above and are used to ascertain, on the basis of tables, a variable for control application to the electric motor. Instead of a table, another calculation method and/or a characteristic curve can be used to ascertain the variable for control application to the electric motor.

For example, as a function of the parameter a driving time of the electric motor during an impact operating mode can be specified as a variable, such that upon activation of the power tool, in particular by an actuation of a switch, the electric motor is driven for the specified driving time, for example in order to screw a screw into a workpiece in the impact operating mode. The driving time can be extended by an amount equal to the first time span, since the driving time is calculated only after the first time span.

In addition, a torque and/or a rotation speed with which the electric motor is driven in the impact operating mode upon activation of the power tool, in particular upon actuation of a switch, can be specified as a function of the parameter. In an embodiment, corresponding tables, characteristic curves, or formulas are stored for that purpose in order to ascertain, as a function of the detected parameter, values for the current and/or rotation speed of the electric motor during the impact operating mode of the electric motor.

The detected parameter can furthermore be weighted as a function of a battery voltage of the power tool, in particular if the battery voltage is below a predefined limit value.

For example, a standard deviation of the current and/or an average standard deviation of the current, and/or a standard deviation of the rotation speed and/or an average standard deviation of the rotation speed, are used as a parameter. The parameter can furthermore be weighted with the charge state of the battery before a variable of electrical control application to the electric motor is specified as a function of the parameter or of the weighted parameter.

The driving time can furthermore be ascertained, for example during the impact operating mode, from the parameter, i.e. as a function of the standard deviation of the current and/or as a function of the average standard deviation of the current, and/or as a function of the standard deviation of the rotation speed and/or as a function of the average standard deviation of the rotation speed. For example, the charge state of the battery is also taken into consideration in the determination of the driving time. For example, a characteristics diagram, a characteristic curve, or a corresponding calculation method, with which the driving time is ascertained as a function of the standard deviation of the current and/or as a function of the average standard deviation of the current, and/or as a function of the standard deviation of the rotation speed and/or as a function of the average standard deviation of the rotation speed, is used in order to ascertain the driving time, i.e. the duration of the driving time during an impact driving mode. In addition, for example, the charge state of the battery is taken into consideration. The ascertained driving time is stored in memory 51.

For example, control circuit 46 can check whether, during a first time span at program point 420, the standard deviation of the current is greater than a first limit value X1 and/or whether the standard deviation of the rotation speed is greater than a first limit value Y1. If these conditions are not satisfied, execution then branches to program point 430 and electric motor 20 is driven at a moderate rotation speed.

For example, control circuit 46 can check whether, during a first time span at program point 420, the average standard deviation of the current is greater than a first limit value X2 and/or whether the average standard deviation of the rotation speed is greater than a first limit value Y2. If the two conditions are not satisfied, execution then branches to program point 430 and electric motor 20 is driven at a moderate rotation speed.

If the queries at program point 420 are satisfied, execution then branches to program point 440 and electric motor 20 is driven at a high rotation speed.

Execution then branches to program point 450. A high speed at program point 440 is necessary in order to furnish a sufficiently high torque for a tool having a large diameter. A moderate speed at program point 430, conversely, ensures that a tool having a smaller diameter does not break.

At program point 450 a check is made as to whether the ascertained driving time of the electric motor during the impact operating mode of the power tool has been reached. If so, then at program point 460 the torque of the electric motor is reduced or a clutch is opened, or the electric motor is shut off. Also in the case of an operating mode at a moderate speed or rotation speed of the drive system in accordance with program point 430, a check is made at program point 450 as to whether the ascertained driving time during the impact operating mode of the power tool has been reached. If so, then at program point 460 the torque of the electric motor is reduced or a clutch is opened, or the electric motor is shut off.

Depending on the embodiment selected, other methods or calculation procedures can also be used in order to ascertain, as a function of the current and/or rotation speed during the impact operating mode of the power tool, a variable for control application to the electric motor, in particular a driving time for the impact operating mode. In addition, depending on the embodiment selected, the different rotation speeds can be omitted and the electric motor can be operated during the impact operating mode at a predefined rotation speed and/or with a predefined torque.

Figure 5:
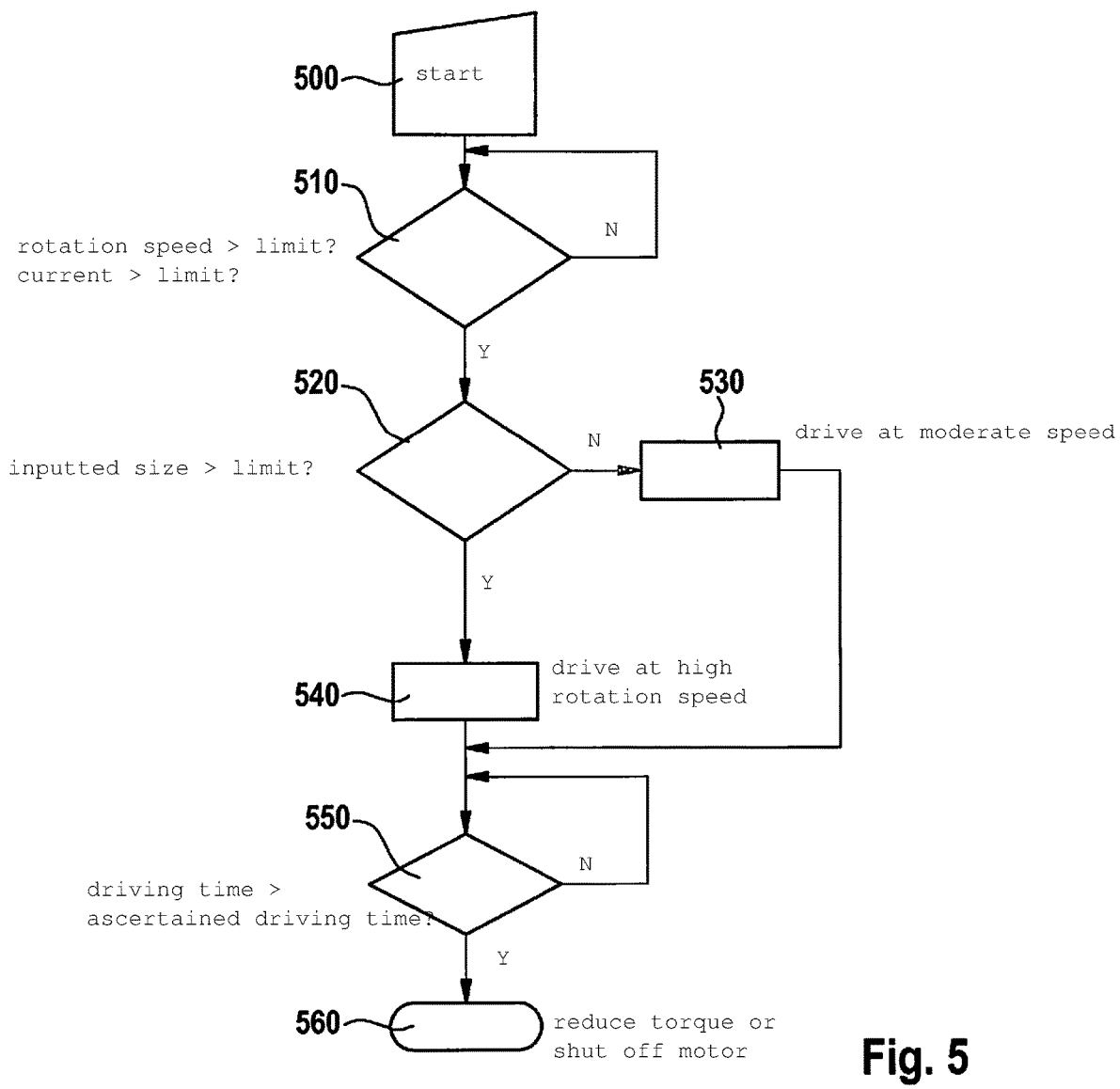
FIG. 5 shows a second schematic program sequence for operating the power tool.

FIG. 5 shows a further embodiment of the method. The program starts at program point 500. The power tool has an input unit 50 by way of which an operator can enter a variable of a tool, in particular a diameter of a drill bit or of a screw. The inputted variable is stored in memory 51. Preferably the charge state of the battery is also ascertained in the context of startup at program point 500. At program point 510 a check is then made as to whether the rotation speed n is higher than a first limit value W, and whether the current i of the electric motor is higher than a first limit value I. If both conditions are not met, program point 510 is carried out again. The method step 510 identifies whether the power tool is in a predefined operating state, in particular in an impact operating mode. The limit values W, I for the rotation speed and current are selected accordingly. If the result of the check at program point 510 is that the rotation speed n is higher than the limit value W, and that the current i of the electric motor is higher than the limit value I, a predefined operating state, in particular an impact operating mode, is then recognized and execution branches to program point 520.

In a further embodiment it is possible to check whether an impact operating mode exists by the fact that a time span between two impacts of the impact operating mode is less than a first limit value. The first limit value can be in the range between 0.01 second and 0.05 second. The first limit value is stored in memory 51. The impacts can be detected, for example, acoustically based on acoustic sensors, or can be ascertained based on the change over time in the current through the electric motor. It is also possible to check whether a standard deviation of the measured rotation speed is less than a second limit value. The second limit value can be in the range between 30 and 90. The second limit value is stored in memory 51. If both conditions are met, an impact operating mode of the power tool is unequivocally recognized. The limit values are ascertained experimentally and can vary from one power tool to another, for example depending on the type of electric motor.

At program point 520, a driving time for the electric motor is ascertained as a function of the inputted size of the tool. A characteristics diagram, a characteristic curve, or a corresponding calculation method, with which the driving time is specified as a function of the size of the tool, is used, for example to ascertain the driving time, i.e., the duration of the driving time.

At program point 520 a check is also made as to whether the inputted size is greater than a stored second comparison value. If the result of the check at program point 520 is that the inputted size is not greater than the second comparison value, execution then branches to program point 530. For example, the second comparison value can correspond to a diameter of 14 mm. At program point 530 the electric motor is driven at a moderate speed.

If the result of the check at program point 520 is that the inputted size is greater than the second comparison value, execution then branches to program point 540. At program point 540 the electric motor is driven at a high rotation speed, i.e. a high speed. Both after program point 530 and after program point 540 a query is then made at a subsequent program point 550 as to whether the measured driving time during the predefined operating state, in particular during an impact operating mode, is greater than the ascertained driving time. If this is not so, the tool then continues to be driven by the electric motor.

If the result of the check at program point 550 is that the measured driving time is greater than the ascertained driving time, at program point 560 the torque of the electric motor is then reduced, a clutch is opened, or the electric motor is shut off.

Figure 4:
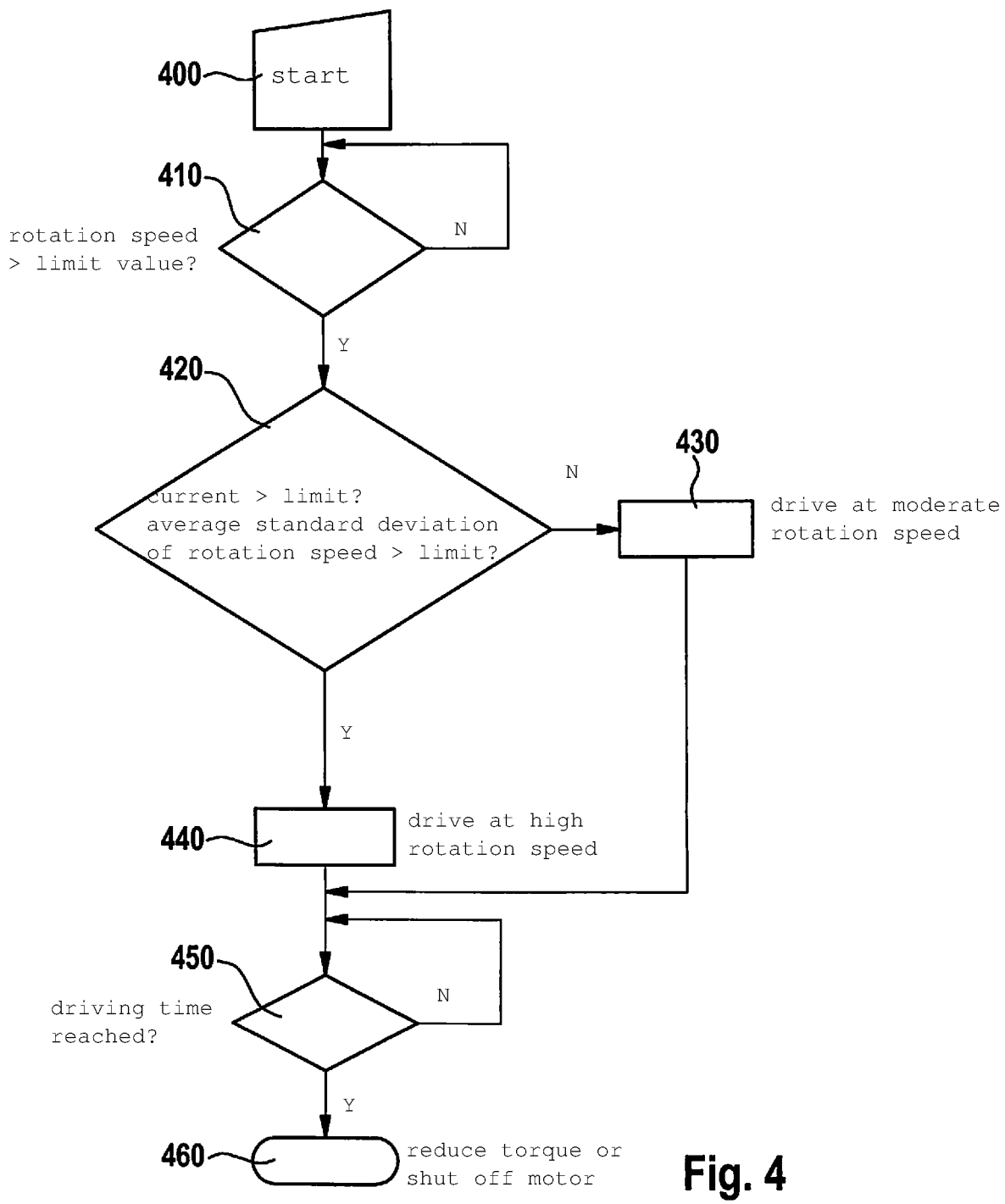
FIG. 4 shows a first schematic program sequence for operating the power tool.

As already discussed with regard to the program sequence of FIG. 4, a high speed is necessary in order for a tool, in particular a drill bit or a screw, having a large diameter to generate sufficient torque. The higher the rotation speed, the greater the torque.

Figure 6:
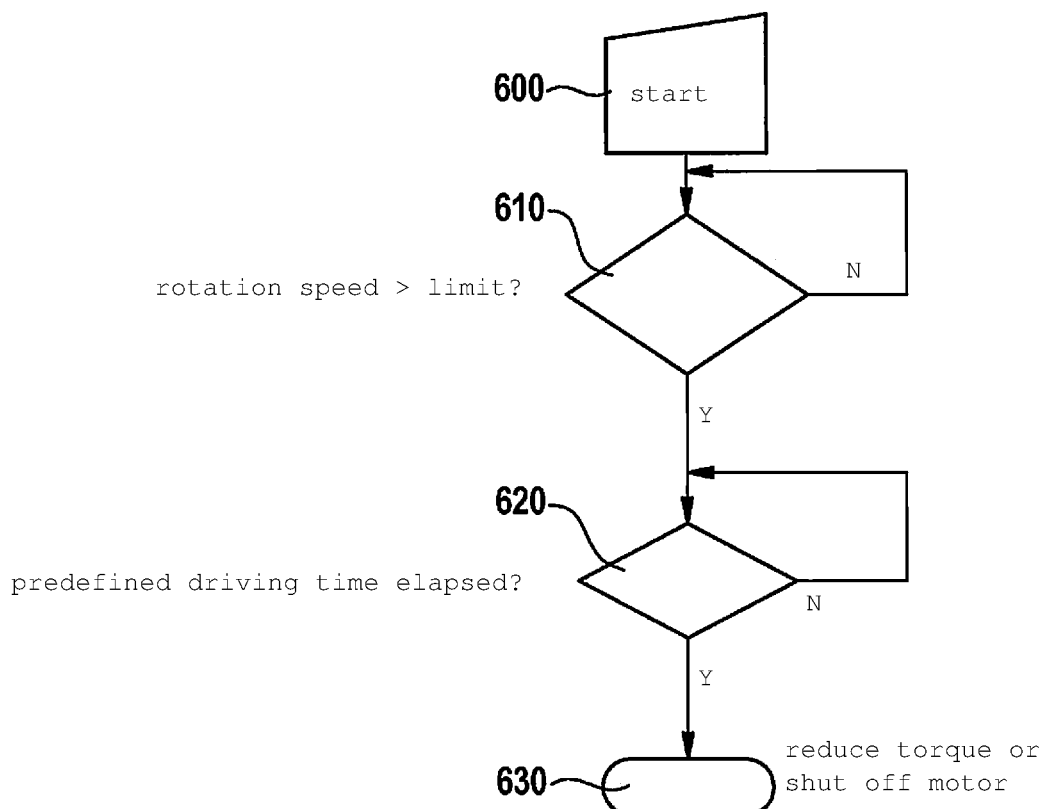
FIG. 6 shows a third schematic program sequence for operating the power tool.

In a further embodiment that is depicted in FIG. 6, the program starts at program point 600, an operator of the power tool having inputted via input unit 50 a driving time for a predefined operating state, in particular a driving time for an impact operating mode. The drive time can be stored in memory 51. The drive time can be, for example, in the region of 10 seconds. Execution then branches to program point 610. At program point 610 a check is made as to whether the rotation speed n of the electric motor is higher than a first limit value W, and whether the current i for the electric motor is above a first limit value I.

Program point 610 can serve to identify whether a predefined operating state, in particular an impact operating mode of the power tool, exists. The limit values W and I are selected accordingly. Other methods for recognizing an impact operating mode can moreover also be used. If an impact operating mode has been recognized, the electric motor is then operated, as a function of the size of the tool, in particular as a function of the diameter of the drill bit or of the screw, for the driving time predefined by the operator with a specified torque and/or at a specified rotation speed. At program point 620 a check is then made as to whether the predefined driving time has elapsed. If so, the torque of the electric motor is reduced, in particular the electric motor is shut off at the subsequent program point 630.

In further embodiments the driving time, the torque, and/or the speed of the electric motor for the methods according to FIGS. 4 to 6 are adapted by control circuit 46 as a function of the charge state of the battery. Corresponding calculation methods, characteristics diagrams, and/or characteristic curves are stored for this purpose in memory 51. This ensures that regardless of the charge state of the battery, a drill bit and/or a screw is screwed a predefined number of revolutions into a workpiece or is screwed in with a predefined tightening torque.

In a further embodiment a warning signal is outputted by control signal 46 if the voltage of battery 19 falls below a predefined minimum value that is stored in memory 51. This ensures that the user of the power tool has the capability of recharging the battery, or of correspondingly adapting the driving time, the rotation speed, and/or the torque, in order to achieve a desired drilling result or screwing-in result.

Depending on the embodiment selected, before the electric motor is shut off an electronic clutch is activated and the torque to the tool is reduced, and then the electric motor is shut off. The charge state of the battery is preferably ascertained, for example by detecting the voltage of the battery, every time a program sequence is started.

Operation of the electric motor is then stopped at a program point 620 when the predefined time span for the driving time is reached. In a further embodiment the driving time predefined by the user can be increased as a function of the charge state if the charge state of the battery has decreased as compared with the reference value. For example, the driving time can be elevated by the same value, as a percentage, that the battery is below the reference value. Depending on the embodiment selected, other orders of magnitude or methods for adapting the driving time as a function of the present charge state of the battery can also be selected. Control circuit 46 can also output a signal if the present charge state of the battery is below a predefined minimum threshold.

Figure 7:
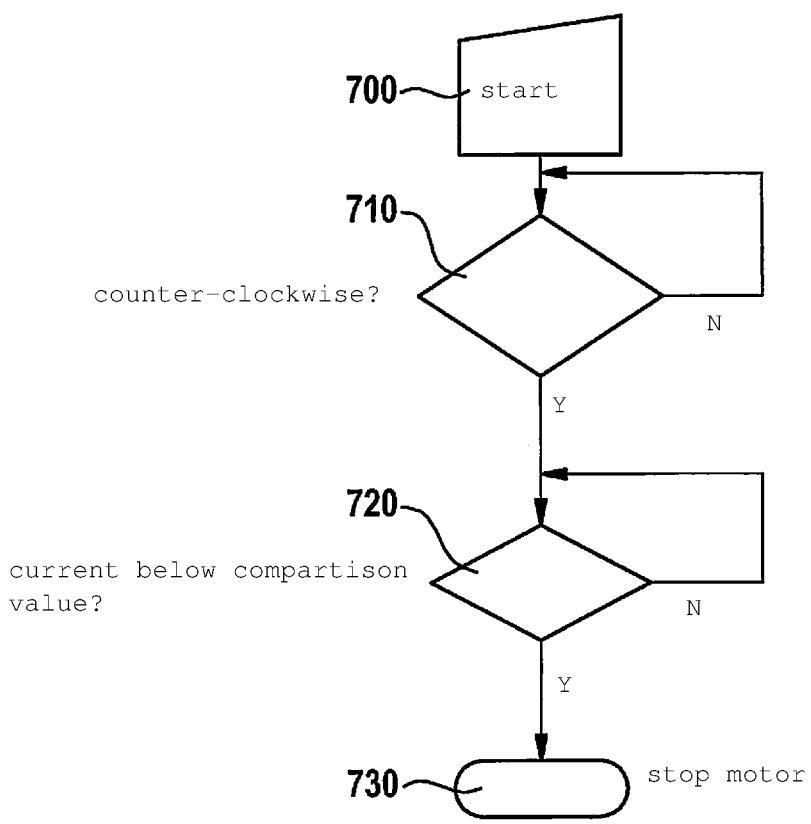
FIG. 7 shows a fourth schematic program sequence for operating the power tool.

FIG. 7 shows a fourth method for operating the power tool. After startup at program point 700, at a subsequent program point 710 a check is made as to whether the electric motor is in a counter-clockwise operating state, i.e., in an unscrewing operating mode in which a screw is being unscrewed out of a workpiece. If so, at a subsequent program point 720 monitoring occurs as to whether the current of the electric motor, and thus the torque of the electric motor, fall below a comparison value. If so, execution then branches to program point 730 and the electric motor is stopped. In addition, depending on the embodiment selected, a maximum time span for the unscrewing of a screw, which can be measured after the unscrewing operating mode is recognized, can be used. The maximum time span is, for example, stored in memory 51. When the maximum time span is reached, execution branches from method step 720 to method step 730 and the electric motor is stopped. In the context of unscrewing of a screw, firstly an impact operating mode is used in order to disengage the screw from the workpiece. After a certain impact operating mode duration the screw is disengaged, and the torque with which the screw is retained in the workpiece decreases appreciably. The current of electric motor 20 correspondingly also decreases. The decrease in current is detected by control circuit 46 with the aid of current meter 54, and according to method step 720 control circuit 46 terminates the unscrewing of the screw after the maximum time span or after the current has decreased below the comparison value.

In a further embodiment, after activation of the electric motor in order to unscrew a screw from a workpiece, a specified number of revolutions can be predefined after which the electric motor stops. For example, the number can be predefined by an operator. For example, three stages can be predefined: low, middle, and high. The low stage means, for example, three revolutions; the middle stage means, for example, five revolutions; and the high stage means, for example, eight revolutions. The revolutions are, for example, measured with a sensor or determined on the basis of the current profile of the electric motor.

Figure 8:
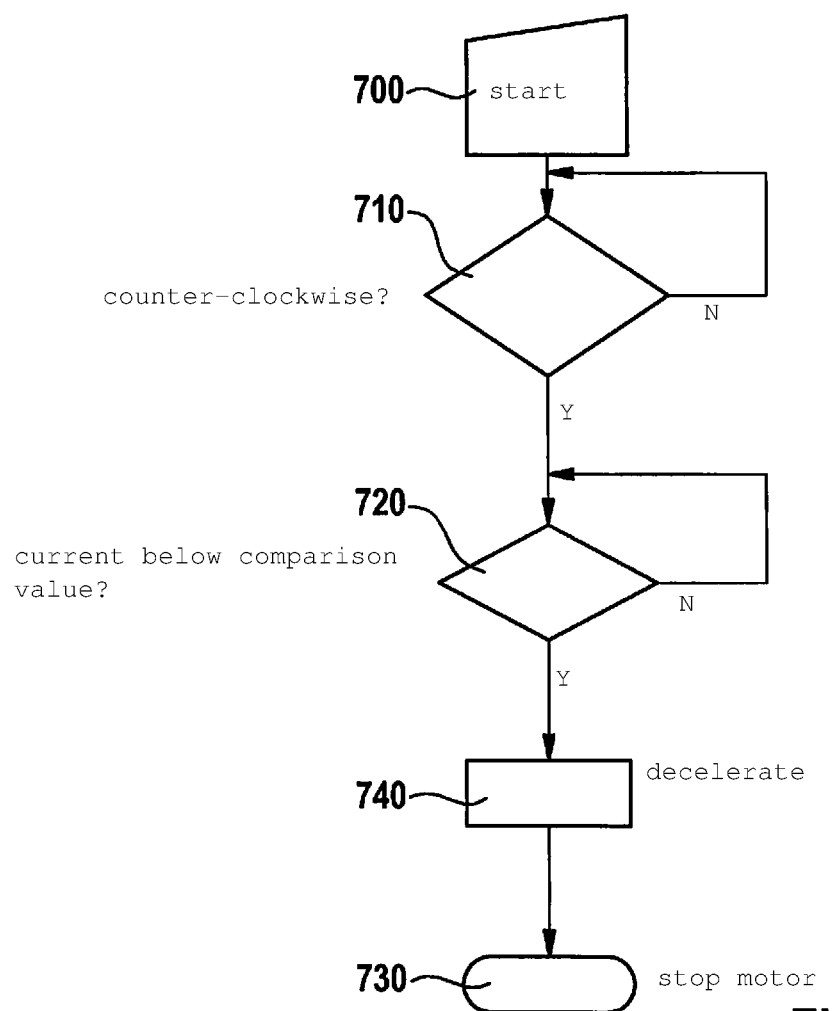
FIG. 8 shows a fifth schematic program sequence for operating the power tool.

FIG. 8 shows a further embodiment of the method according to FIG. 7, in which electric motor 720 is not immediately stopped by control circuit 46 upon recognition of a current below the comparison value in method step 720 but instead, in a subsequent method step 740, is firstly decelerated by a corresponding voltage supply to drive coils 23c and then stopped in a subsequent method step 730. Electric motor 20 is in any event stopped at program point 730 once the maximum predefined time span is reached.

Figure 9:
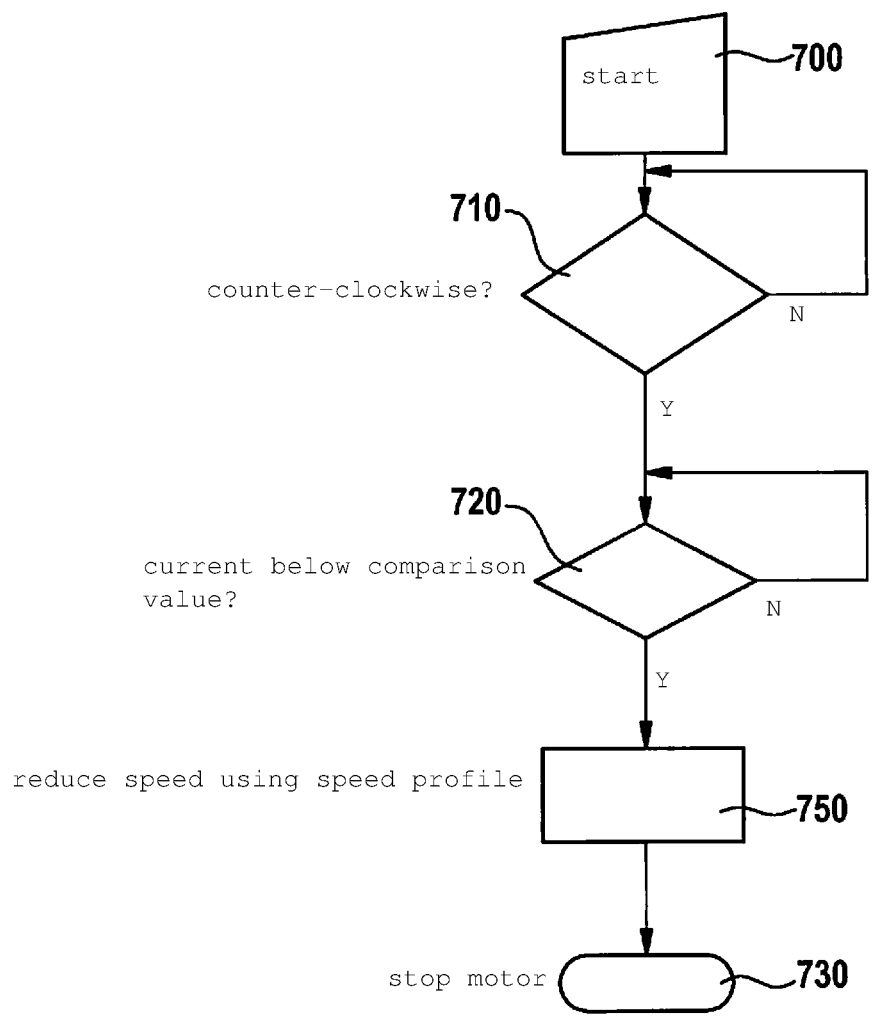
FIG. 9 shows a sixth schematic program sequence for operating the power tool.

FIG. 9 shows a further embodiment of FIG. 7 in which, after program point 720, instead of a simple deceleration procedure in accordance with program point 740 of FIG. 8, the rotation speed of the electric motor is reduced by control circuit 46 in accordance with a predefined speed profile by corresponding control application to drive coils 23c, and the electric motor is then stopped at a subsequent program point 730. The speed profile of program step 750 can involve, for example, a linear reduction of the rotation speed or a stepped reduction of the rotation speed of electric motor 20. Other speed profiles can also be used depending on the embodiment selected.

Figure 10:
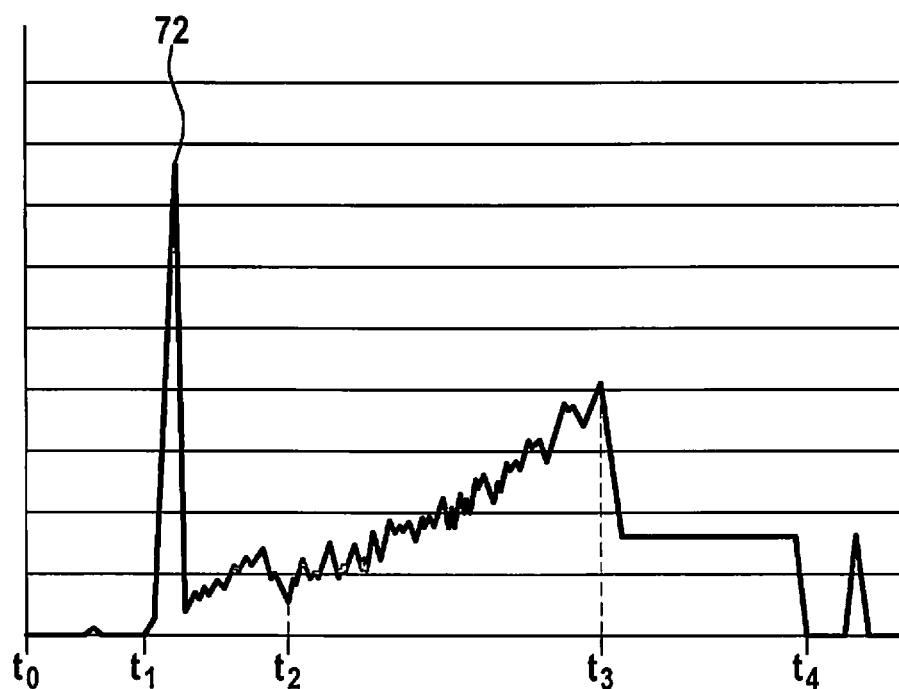
FIG. 10 schematically depicts a change over time in the current I for the electric motor in the context of unscrewing a screw.

FIG. 10 schematically depicts a change over time in the current I for the electric motor in the context of unscrewing a screw that is screwed into a workpiece. The profile of the current I of the electric motor of the power tool can be used to obtain information regarding the fastening state of the screw. Different methods for automatically unscrewing the screw can be carried out depending on the manner of fastening. Three essential phases of the current profile can be taken into consideration for recognition of the fastening state.

At the zero time t0 the electric motor is not activated. At a subsequent first time t1 the rotation direction of the power tool is set to counter-clockwise, i.e. to unscrewing of a screw, and at the first time t1 the electric motor is furthermore activated with the aid of main switch 18 or trigger 18t in order to unscrew the screw. In the present example the screw is screwed firmly into a workpiece with a high seating force. Upon activation of the electric motor to unscrew the screw, the current for the electric motor therefore rises quickly and to a high level in a first phase shortly after activation of the electric motor, so that a current peak 72 occurs shortly after the first time t1 and is detected with the aid of the current meter. Current peak 72 indicates that a screw that is screwed into a workpiece with a high seating torque is being disengaged. After a brief time the current decreases again from the peak value. At a second time t2 the impact operating mode of the power tool is activated in order to disengage the tightened screw. Operation of the impact mechanism can be recognized based on a ripple in the current profile and based on a rise in the current between the second time t2 and a third time t3. The impact operating mode between the second and the third time represents the second phase. After the third time t3 the current abruptly decreases to a lower value. The value of the decrease in current can be in the range of 20% and more. The abrupt current decrease indicates a third phase in which the screw is loosened and the impact operating mode is no longer active. In the third phase the screw can be unscrewed out of the workpiece with a lower torque as compared with the impact operating mode. What is recognized on the basis of the current decrease after the third time t3 is therefore that the screw can now be unscrewed without the impact operating mode. Between the third time t3 and a fourth time t4 at which the current decreases, the screw is unscrewed from the workpiece with little resistance. This typical current profile in the context of unscrewing a screw that is screwed into a workpiece can be used for an automated method in which the screw is to be prevented from being completely unscrewed out of the workpiece so that the screw does not completely disengage from the workpiece.

For example, the rotation speed of the electric motor is reduced, in particular the electric motor is stopped, when the value of the current decreases below a predefined limit value after the third time t3. For example, the rotation speed of the electric motor is reduced, in particular the electric motor is stopped, when the negative time-related gradient of the current after the third time t3 is greater than a comparison gradient. Both the limit value for the current and/or the comparison gradient can depend on a current of the electric motor in the initial phase in the context of unscrewing the screw. The current that is consumed by the electric motor depends on the seating torque of the screw. The initial phase can begin after the first time t1 and extend to the second and/or third time t2, t3. In addition, the initial phase can also begin only at the second time t2 and extend to the third time t3. In addition, both the limit value for the current and/or the comparison gradient can assume different values as a function of a rotation speed of the electric motor predefined by an operator and/or as a function of an actuation speed of a switch for predefining the rotation speed.

In addition, in an embodiment, after the third time t3 a disengaged screw is recognized as a function of the current falling below a predefined limit value and/or as a function of a negative time-related gradient of the current exceeding a predefined value, and the rotation speed of the electric motor is at least reduced or the electric motor is stopped.

The seating torque of the screw can be estimated based on a current that is consumed by the electric motor in the context of unscrewing the screw in particular in an initial phase after the first time t1, in particular after the second time t2. The limit values and comparison gradients can also, for example, be ascertained experimentally in experimental series and saved.

A soft braking method for stopping the electric motor can be used at the end of the method in order to implement an automatic unscrewing function. In a simple embodiment, for example, upon recognition of the current decrease after the third time t3 the speed of the motor can be reduced or decelerated to a predefined low speed. The deceleration of the electric motor can be carried out until the speed of the electric motor is less than the mechanical resistance of the power tool. The rotation speed of the electric motor is then gradually reduced to the value zero. The motor is thereby decelerated more quickly to the zero rotation speed. The deceleration of the electric motor can be accomplished mechanically or by corresponding electrical control application to the electric motor.

Figure 11:
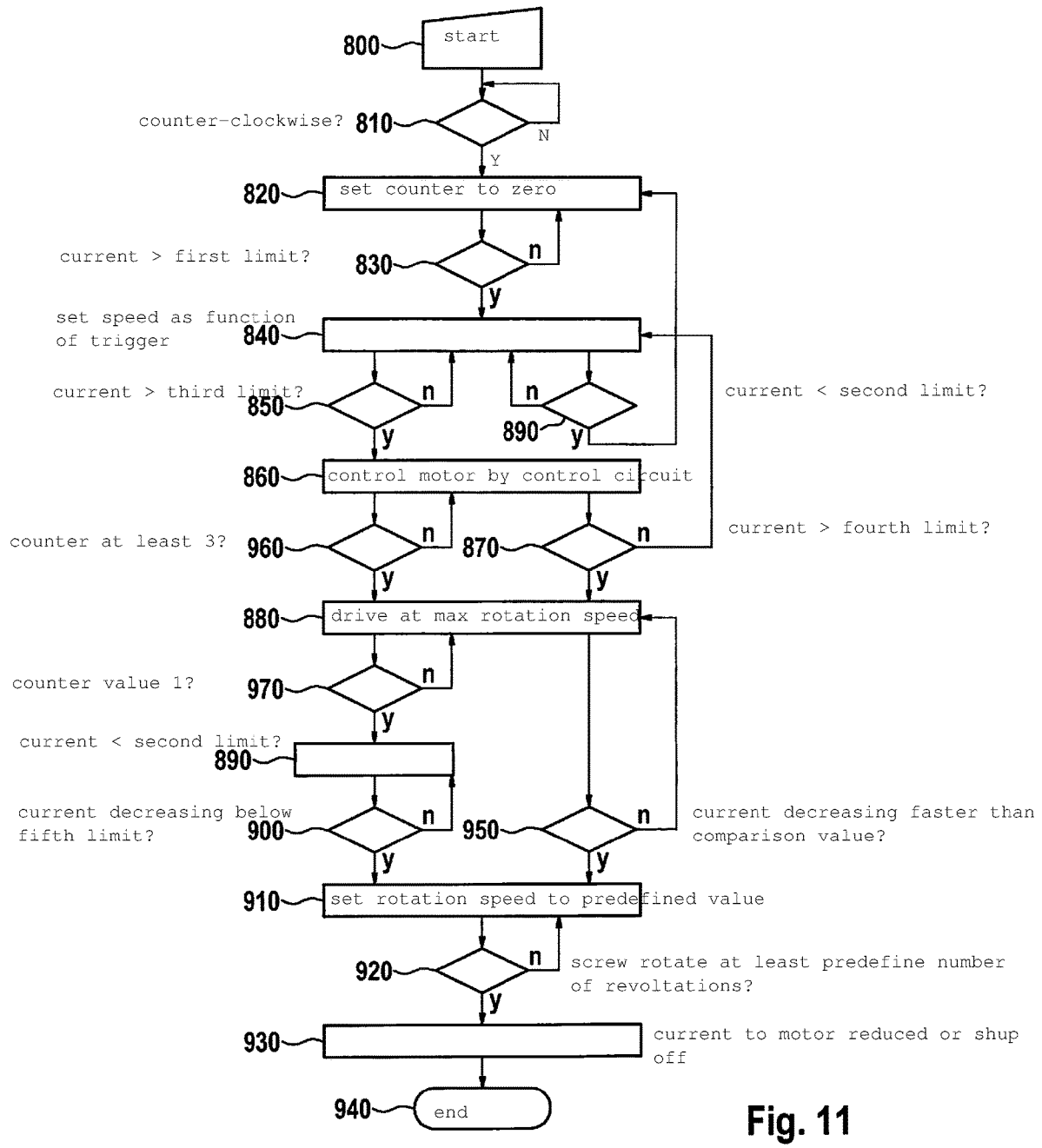
FIG. 11 schematically depicts a program sequence with which influence is exerted on the unscrewing of a screw from a workpiece.

FIG. 11 schematically depicts a program sequence with which the unscrewing of a screw from a workpiece can be influenced in such a way that the screw is not completely disengaged from the workpiece. This prevents the screw from disengaging completely from the workpiece. This is advantageous in particular when the screw is being disengaged with the power tool over an operator's head. This is also advantageous when larger screws or bolts are being disengaged at great heights, for example on an outer façade of a building, and could fall onto passersby. In addition, with the aid of the proposed method an unnecessary limitation of the rotation speed of the power tool, or shutoff of the power tool, for example upon actuation of the power tool with no load, is avoided. This eliminates uncertainty on the part of the operator regarding the functionality of the power tool. A limitation of the rotation speed or a shutoff of the electric motor occurs when a disengaged screw has been detected. It is thus possible for the power tool to function even under low or no load.

In an embodiment, once disengagement of the screw from firm seating in the workpiece has been recognized on the basis of the current decrease after the third time t3 (FIG. 10), the number of revolutions of the screw is detected. For this, the rotation of the electric motor can be detected with the aid of a sensor, for example with the aid of the magnetic sensor. For example, once the current decrease after the third time t3 has been recognized, a current flow through the electric motor can be automatically terminated after a predefined number of 360-degree revolutions of the screw. For example, once the current decrease at the third time t3 has been recognized, the electric motor can be automatically shut off by the control circuit after three or five or eight revolutions even though the operator continues to actuate trigger 18t. Depending on the embodiment selected, the operator can specify, by actuating the input unit, the number of revolutions after which the electric motor is stopped once the current decrease is recognized at the third time t3.

A variety of operating situations in the context of automatic disengagement of the screw can be taken into consideration with the aid of the program sequence depicted in FIG. 11. For example, control circuit 46 can carry out different methods for disengaging the screw depending on the load, i.e. depending on the torque with which the screw is seated in the workpiece. In order to carry out different automatic methods for preventing complete disengagement of the screw from the workpiece upon disengagement of the screw, control circuit 46 can furthermore take into consideration, in addition to or instead of the load, the manner in which trigger 18t of main switch 18 is actuated by an operator. The "load" is understood as the torque that is initially required in order to rotate the screw seated firmly in the workpiece. The higher the seating torque with which the screw is screwed into the workpiece, the greater the load or torque that must be applied by the electric motor in order to rotate the screw.

Execution of the program for a first operating situation, in which the screw is seated in the workpiece with a high seating torque and a high rotation speed is established by an operator in the power tool in order to unscrew the screw, will be described below. The program starts at a program point 800 at which the power tool is put into operation. Switch 70 is in the position in which the automatic method for preventing complete disengagement of the screw from the workpiece is activated. At a subsequent program point 810, a check is then made as to whether the power tool is in the operating mode for unscrewing a screw or nut, i.e., for example, counter-clockwise rotation. If so, execution then branches to a subsequent program point 820 and a counter is set to the value of zero.

At program point 820 it is also possible to detect the rotation speed being requested from the power tool by an operator. For example, an operator can establish a low rotation speed for disengaging the screw. The desired rotation speed can be detected based on the manner of actuation of trigger 18t. In the present case trigger 18t is pressed completely to the stop, so that a maximum rotation speed of the electric motor of the power tool is desired by the operator. In addition to or instead of the manner in which trigger 18t is partly or completely pressed, an actuation speed of trigger 18t can also be detected. The actuation speed of trigger 18t can be taken into consideration, in addition to or instead of the actuation travel of trigger 18t, in the context of the subsequent automatic methods. The actuation speed of the trigger and/or the actuation travel of the trigger can be detected with corresponding sensors such as an acceleration sensor or Hall sensor, and conveyed to control circuit 46. Control circuit 46 recognizes a desired low rotation speed in a context of an actuation travel of less than 50% of the possible actuation travel of trigger 18t. Control circuit 46 recognizes a desired high rotation speed, for example, in the context of an actuation travel of more than 50% of the possible actuation travel of trigger 18t. Control circuit 46 can also assume a low rotation speed in the context of an actuation speed of trigger 18t if the actuation speed is below a stored comparison value. Control circuit 46 can furthermore assume a desired high rotation speed in the context of an actuation speed of trigger 18t if the actuation speed is above a stored comparison value.

In an embodiment, at program point 820 the rotation speed of the electric motor is set proportionally to the actuation travel of trigger 18t. If trigger 18t is pressed in only halfway, control is applied to the electric motor by the control circuit with only half the maximum possible rotation speed. If the trigger is pressed in completely, the control circuit then applies control to the electric motor with a maximum possible rotation speed. The actuation speed of the trigger can correspondingly also be taken into consideration.

At a subsequent program point 830 a check can also be made as to whether the current I is higher than a predefined first limit value I1 for longer than a predefined first time span t1. The first time span t1 can be, for example, between 0.03 and 0.1 second. If so, execution then branches to a subsequent program point 840. If not, program point 820 continues to be carried out. At program point 840 the rotation speed of the electric motor continues to be established, as at program point 820, as a function of the manner of actuation of trigger 18*t*.

At a subsequent program point 850 a check is made as to whether the current of the electric motor rises above a predefined third limit value I3. If so, the counter is then incremented by the value 1 to the value 1, and execution branches to a subsequent program point 860. This is the case in the present first operating situation.

If not, program point 840 continues to be executed. If the program remains at program point 840 for longer than a predefined second time span t2, then at a program point 890 a check is made as to whether the current I of the electric motor is less than a predefined second limit value I2. If so, execution then branches back to program point 820. If not, program point 840 continues to be executed.

At program point 860 the rotation speed of the electric motor continues to be controlled by the control circuit, as at program point 820, as a function of how trigger 18*t* is actuated. At program point 860 a check is additionally made, at a program point 960, as to whether the counter has a value of at least 3. If so, execution branches directly to program point 880. If not, the program remains at program point 860.

If the program remains at program point 860 for longer than a predefined second time span t2, a check is then made at a program point 870 as to whether the current of the electric motor is higher than a predefined fourth limit value I4. Different values can be stored for the fourth current value I4 as a function of a seating torque of the screw and/or as a function of the operator's desired rotation speed, i.e. as a function of the actuation travel of trigger 18*t* and/or as a function of the actuation speed of trigger 18*t*. Various operating situations can thereby be implemented using different automatic methods. If the current of the electric motor is higher than a predefined fourth limit value I4, execution then branches from program point 870 to program point 880. This is the case in the present first operating situation. If it is not the case, execution branches back to program point 840.

At program point 880 the electric motor is driven by the control circuit at a maximum rotation speed. The rotation speed of the electric motor is thus set to a high value independently of the manner of actuation of the trigger, in particular to 100% of the maximum possible rotation speed. Values other than 100% of the maximum rotation speed can, however, also be used.

At program point 970 a query is made as to whether the counter has the value 1. If so, execution then branches to program point 890. If not, the program remains at program point 880.

If the program remains at program point 880 after the query of program point 870, a check is then made at program point 950 as to whether the current I exhibits a greater decrease over time than a predefined comparison value, i.e. whether the current of the electric motor is decreasing faster than the comparison value. The comparison value is stored in the memory. If this is not so, execution branches back to program point 880. If the result of the query at program point 950 is that the current I of the electric motor is decreasing faster, i.e. represents a greater negative time-related gradient than the predefined comparison value, execution then branches to program point 910. If the negative time-related gradient of the current is greater than the comparison value, this indicates that the screw is disengaged and can be rotated with a low torque.

At program point 890 the maximum rotation speed continues to be predefined by control circuit 46 for the electric motor. In addition, a check is made at a subsequent program point 900 as to whether the current of the electric motor is decreasing below a fifth limit value I5. If so, this means that the screw is disengaged, and execution branches to a subsequent program point 910. If not, program point 890 continues to be executed.

At program point 910 the rotation speed is set to a predefined value that is, for example, less than 50% of the maximum rotation speed. The predefined value can be, for example, between 5% and 10% of the maximum rotation speed, or less. A revolution counter is also set to the value zero. After a predefined third time span t3 at program point 910, a check is then made at a subsequent program point 920 as to whether the screw has rotated at least a predefined number of revolutions. If so, execution branches to program point 930 and at least the current flow to the electric motor is reduced or shut off, or the electric motor is decelerated. The program is then terminated at program point 940.

The predefined number of revolutions can be, for example, between three and eight complete revolutions. If the result of the query at program point 920 is that the predefined number of revolutions has not yet been reached, the electric motor then continues to be driven in accordance with program point 910, and the query of program point 920 is carried out again until the number of predefined revolutions has been reached and execution branches to program point 930.

In a second operating situation, in which the screw is seated in the workpiece with a low seating torque and the operator desires a high rotation speed of the power tool, the program sequence according to FIG. 11 is executed as follows:

The method corresponds to the method described for the first situation except that because of the low seating torque, the fourth current value I4 is selected to be lower than in the first operating situation. For example, different values for the fourth current value I4 can be stored as a function of the detected seating torque of the screw and/or as a function of the operator's desired rotation speed, i.e., as a function of the actuation travel of trigger 18*t* and/or as a function of the actuation speed of trigger 18*t*. The fourth current value I4 is to be selected so that the result of the query at program point 870 is that the measured current is higher than the fourth limit value I4, and after the second time span t2 execution therefore branches at program point 860 to program point 880. At program point 880 the electric motor is again supplied with a predefined high rotation speed, in particular with maximum rotation speed, for a predefined time span. Because in this case the counter has the value 1, the result of the query at program point 970 is that execution branches to program point 890. This means that a state exists with a low screw seating torque and a high desired rotation speed of the power tool. Program points 900 and following according to FIG. 11 are then executed.

In addition, for a low screw seating torque a lower third limit value I3 for the current can also be stored, as compared with the first operating situation with a high seating torque. For example, tables or diagrams can be stored in which different values for the limit values are stored as a function of the detected seating torque of the screw. The control circuit selects the corresponding limit values as a function of the seating torque of the screw which is estimated during the at the beginning of the program. The seating torque of the screw can be estimated at program point 820, for example, as a function of the current or as a function of the increase in the current of the electric motor during the initial phase. Corresponding diagrams or characteristic curves or characteristics diagrams, with which a seating torque can be associated with a current profile during program point 820, can be stored for this purpose. A torque sensor on the power tool can also be used to measure the seating torque of the screw in the initial phase. The limit values can be ascertained or specified by the control circuit as a function of the torque or seating torque of the screw which occurs as the screw begins to be unscrewed. For example, correspondingly different values for the first, the second, the third, and/or the fourth limit value can be stored for predefined torque ranges. Otherwise the method is executed in accordance with the first operating situation.

For a third operating situation in which the screw is seated in the workpiece with no substantial seating torque, i.e. no load exists and a high rotation speed is desired, the method according to FIG. 11 is executed as follows:

From program point 800 to program point 860 the method proceeds in accordance with the second operating situation as described above. At program point 860 the electric motor is operated by control circuit 46 in accordance with the operator's desired rotation speed. The query at program point 870, as to whether the current of the electric motor is higher than the fourth limit value I4, then occurs. The fourth limit value I4 is to be selected, as a function of the existing seating torque (i.e. no seating torque), to be even lower than in the second operating situation. The result of the query at program point 870 is consequently that the measured current is lower than the fourth limit value I4. Execution thus branches back to program point 840. Program point 840 is then executed. At a subsequent program point 850 a check is made as to whether the current of the electric motor rises above a predefined third limit value I3. If so, the counter is then incremented by the value 1 to the value 1, and execution branches to a subsequent program point 860. At this point in time the current is higher than the third limit value I3, so that based on the query at program point 850 the counter is incremented by the value 1 to the value 2.

At program point 860 the electric motor is then operated by control circuit 46 in accordance with the operator's desired rotation speed. At program point 860 a check is additionally made, based on program 960, as to whether the counter has a value of at least 3. If so, execution branches to program point 880. This is not so, however, so that the program remains at program point 860. If the program remains at program point 860 for longer than the second time span t2, the query as to whether the current of the electric motor is higher than the fourth limit value I4 then occurs at program point 870. Such is not the case, and execution therefore branches back to program point 840.

The query at program point 850 as to whether the current is higher than the third limit value I3 thus occurs again at program point 840. In the present situation the current is lower than the third limit value I3, so that the program remains at program point 840. If the result of the query at program point 890 is that the current is lower than the second limit value I2, execution then branches back to program point 820 and the program is correspondingly further executed.

If the operator then actuates trigger 18t to a maximum value, the program recognizes, for example from a low current, that there is no load, i.e., no screw seating torque. As a consequence, the program remains at program point 840 and the rotation speed of the electric motor is controlled in accordance with the actuation of trigger 18t. With the aid of this method the user can operate the electric motor at the desired rotation speed without activating the automatic limitation of the electric motor drive in accordance with program points 910, 920, 930, and 940. Handling of the power tool is thereby intuitively improved for the user. Because there is no seating torque, the control circuit recognizes that a screw does not need to be disengaged.

In a fourth operating situation that corresponds to a moderate to high load, i.e., to a moderate to high seating torque of the screw, and to a low to moderate rotation speed or a slow rise in rotation speed desired by the operator, the program according to FIG. 11 is executed as follows: The program starts at a program point 800 at which the power tool is put into operation. Switch 70 is in the position in which the automatic method for preventing complete disengagement of the screw from the workpiece is activated. At a subsequent program point 810 a check is then made as to whether the power tool is in the operating mode for unscrewing a screw, i.e., for example counter-clockwise rotation. If so, then at a subsequent program point 820 a counter is set to the value zero.

At program point 800 it is also possible to detect the rotation speed and/or the rise in rotation speed requested by the operator from the power tool. For example, an operator can establish a low rotation speed and/or a slow rise in rotation speed in order to disengage the screw. The rotation speed can be detected by the control circuit based on the manner of actuation of trigger 18t. If trigger 18t is pressed to only a maximum of 60% of the way to the stop, a desired low to moderate rotation speed of the electric motor is recognized. In addition to or instead of the manner in which trigger 18t is partly or completed pressed down, an actuation speed of the trigger can also be detected by the control circuit. If trigger 18t is actuated more slowly than a stored comparison speed, a desired slow rise in the rotation speed is recognized. In addition to or instead of the actuation travel of trigger 18t, control circuit 46 can also take the actuation speed of trigger 18t into consideration in the automatic method below. The actuation speed of the trigger and/or the actuation travel of trigger 18t can be detected with corresponding sensors and conveyed to control circuit 46. A low desired rotation speed is recognized by the control circuit, for example, when the operator presses trigger 18t down only at most 60% of the possible actuation travel. Given the low desired rotation speed, at program point 820 the control circuit can apply control to the electric motor with a rotation speed between 0% and 60% of the maximum rotation speed. A slow rise in the rotation speed of the electric motor is thus achieved.

At a subsequent program point 830 a check is then made as to whether the current I of the electric motor has been higher than a predefined first limit value I1 for longer than a predefined first time span t1. The first time span t1 can be, for example, between 0.03 and 0.1 second. If so, execution then branches to a subsequent program point 840. If not, program point 820 continues to be carried out. At program point 840 the rotation speed of the electric motor continues to be established as a function of the manner of actuation of trigger 18t.

In this operating situation the third limit value t3 for the current at program point 850 is selected, for example, in such a way that the impact mechanism of the power tool becomes actuated. At program point 840 control is applied to the electric motor by control circuit 46 in accordance with the operator's desired rotation speed. The result of the query at program point 850 is then that the current is higher than the third limit value I3, so that execution branches to program point 860. At the same time, the counter is incremented by the value 1 to the value 1. After the second time span t2 the query is then made at program point 870 as to whether the current is higher than the fourth limit value I4. The fourth limit value I4 is selected to be higher than in the second operating situation. The current is thus lower than the fourth limit value I4 in the context of the query at program point 870, so that execution then branches back to program point 840.

At the next program point 850 the result of the query is again that the current is higher than the third limit value I3, so that the counter is incremented by the value 1 and thus now has the value 2.

Execution then branches to program point 860. After the second time span t2 a query is then made at program point 870 as to whether the current is higher than the fourth limit value I4. In the query at program point 870 the current is thus lower than the fourth limit value I4. That is not so, and execution therefore branches back to program point 840.

At the next program point 850 the result of the query is again that the current is higher than the third limit value I3, so that the counter is incremented by the value 1 and thus now has the value 3.

Execution then branches to program point 860. At program point 860 it is then recognized, based on the query at program point 960, that the counter has the value 3, so that execution branches directly to program point 880. The counter value 3 indicates that the screw could be disengaged.

At program point 880 the electric motor is operated at maximum rotation speed. At program point 950 a check is then made as to whether the current of the electric motor exhibits a greater decrease over time than a predefined value. The predefined value for the decrease in current over time is stored in the memory. If the result of the query at program point 950 is that the measured decrease over time is less than the predefined value, execution then branches back to program point 880. If the result of the query at program point 950 is that the measured decrease over time is greater than the predefined value, execution then branches to program point 910. If the decrease in current over time is greater than the predefined value, this indicates that the screw is disengaged. Program points 910 to 940 are then correspondingly executed.

In a fifth operating situation that corresponds to no load and to a low desired rotation speed and/or to a slow desired rise in the rotation speed, the program of FIG. 11 is executed as follows: The program starts at a program point 800 at which the power tool is put into operation. Switch 70 is in the position in which the automatic method for preventing complete disengagement of the screw from the workpiece is activated. At a subsequent program point 810 a check is then made as to whether the power tool is in the operating mode for unscrewing a screw, i.e., for example, counter-clockwise rotation. If so, at a subsequent program point 820 a counter is then set to the value zero.

At program point 800 it is also possible to detect the rotation speed that an operator is requesting from the power tool. For example, an operator can establish a low rotation speed and/or a slow rise in rotation speed for disengagement of the screw. The rotation speed can be detected based on the manner of actuation of trigger 18t. If trigger 18t is pressed completely to the stop, a maximum rotation speed of the electric motor is desired by the operator. In addition to or instead of the manner in which trigger 18t is partly or completely pressed down, an actuation speed of trigger 18t can also be detected, and in addition to or instead of the actuation travel of trigger 18t, the actuation speed of trigger 18t can also be taken into consideration in the subsequent automatic method. The actuation speed of the trigger, and/or the actuation travel of the trigger, can be detected using corresponding sensors and conveyed to control circuit 46.

At program point 820 the rotation speed of the electric motor is set proportionally to the actuation travel of trigger 18t. If trigger 18t is pressed in only halfway, the control circuit then applies control to the electric motor with only half the maximum possible rotation speed. If the trigger is pressed in completely, the control circuit applies control to the electric motor with the maximum possible rotation speed. The actuation speed of the trigger can correspondingly also be taken into consideration.

In this state, program point 820 is maintained until the current is above the first limit value I1. Execution then branches back to program point 840. If the operator reduces the rotation speed of the power tool during program point 840, the current then decreases below the second limit value I2, so that the result of the query at program point 890 is that execution branches back to program point 820.

The program thus recognizes that a low rotation speed and/or a slow rise in rotation speed are desired by the operator, and that no load, i.e. no screw seating torque, exists. This can mean, for example, that no effective connection exists between the power tool and a screw or nut. The operator can thus completely control the rotation of the power tool.

A sixth operating situation, which corresponds to a low load and a slow actuation of trigger 18t, is executed on the basis of the program sequence of FIG. 11 as follows:

The program starts at a program point 800 at which the power tool is put into operation. Switch 70 is in the position in which the automatic method for preventing complete disengagement of the screw from the workpiece is activated. At a subsequent program point 810 a check is then made as to whether the power tool is in the operating mode for unscrewing a screw, i.e., for example, counter-clockwise rotation. If so, at a subsequent program point 820 a counter is then set to the value zero.

At program point 800 it is also possible to detect the rotation speed that an operator is requesting from the power tool. For example, an operator can establish a slow rise in rotation speed in order to disengage the screw. The rotation speed can be detected based on the manner of actuation of trigger 18t. If trigger 18t is actuated more slowly than a stored comparison speed, a slow rise in the rotation speed of the electric motor is therefore desired by the operator. The actuation speed of trigger 18t is taken into consideration in the subsequent automatic method. The actuation speed of the trigger, and/or the actuation travel of the trigger, can be detected using corresponding sensors and conveyed to control circuit 46.

At the next program point 820 the rotation speed of the electric motor is set proportionally to the actuation travel of trigger 18t. If trigger 18t is pressed in only halfway, the control circuit then applies control to the electric motor with only half the maximum possible rotation speed. If the trigger is pressed in completely, the control circuit then applies control to the electric motor with a maximum possible rotation speed. The actuation speed of the trigger can correspondingly also be taken into consideration.

At a subsequent program point 830 a check is then made as to whether the current I of the electric motor is higher than a predefined first limit value I1 for longer than a predefined first time span t1. The first time span t1 can be, for example, between 0.03 and 0.1 second. If this is so, execution then branches to a subsequent program point 840. If it is not so, program point 820 continues to be carried out. At program point 840 the rotation speed of the electric motor continues to be established as a function of the manner of actuation of trigger 18t.

At a subsequent program point 850 a check is made as to whether the current of the electric motor rises above a predefined third limit value I3. If so, the counter is then incremented by the value 1 to the value 1, and execution branches to a subsequent program point 860. If not, program point 840 continues to be executed. The third limit value I3 corresponds to the value that is just sufficient for implementing an impact mechanism when trigger 18t is actuated only slowly, i.e. more slowly than the comparison speed.

If the program remains at program point 840 for longer than a predefined time span t2, a check is then made at a program point 890 as to whether the current I of the electric motor is lower than a predefined second limit value I2. If this is so, execution then branches back to program point 820. If it is not so, program point 840 continues to be executed.

At program point 860 the rotation speed of the electric motor continues to be controlled by the control circuit as a function of the manner of actuation of trigger 18t. At program point 860 a check is also made, at a program point 960, as to whether the counter has at least the value 3. If this is so, execution branches directly to program point 880. If it is not so, the program remains at program point 860.

If the program remains at program point 860 for longer than a predefined time span t2, a check is then made at a program point 870 as to whether the current of the electric motor is higher than a predefined fourth limit value I4.

The fourth limit value I4 has a greater value than in the case of the fourth operating situation. The result of the query at program point 870 is therefore that the current is lower than the fourth limit value. Execution therefore branches back to program point 840. At this time the current is higher than the second limit value I3, so that in accordance with program point 850, execution branches back to program point 860. The counter is furthermore incremented by the value 1 to the value 2. After the second time span t2 the query at program point 870 then takes place. The result of the query is again that the current is lower than the fourth limit value I4, so that execution then once again branches back to program point 840. The result of the subsequent query at program point 850 is again that the current is higher than the third limit value I3, so that the counter is incremented by the value 1 to the value 3, and execution branches to program point 860.

At the subsequent program point 860 it is recognized by way of the query at program point 960 that the value of the counter corresponds to the value 3. Execution thus branches directly to program point 880.

The fourth limit value I4 to be selected for this operating situation should be particularly low in order to enable a transition to program point 880. For example, the limit values, in particular the fourth limit value, are ascertained experimentally and stored. The counter value of 3 means that a low load, with little or slow actuation of trigger 18t, has been recognized. If the load is low, i.e. for example the screw is incompletely or not firmly tightened, the current then decreases more quickly because the screw can be disengaged more easily. After program point 880 the query at program point 950 is made, since the counter does not have the value 1. At program point 950 the query is made as to whether the decrease in current over time is less than a predefined comparison value. The predefined comparison value is stored in the memory, for example, as a negative time-related gradient of the current. If the result of the query at program point 950 is that the measured decrease in current over time is less than the comparison value, execution then branches to program point 910. Program points 910, 920, 930, and 940 are then executed as described.

The methods described can also be applied to the unscrewing of threaded bolts or nuts or other threaded parts. The term "screw" is thus to be understood as any part that can be threaded onto or into a mating part.

The above-described automatic methods for unscrewing a screw as shown in FIG. 11 can furthermore be terminated by a predefined input of the operator, for example by inputting a predefined stop time.

Figure 12:
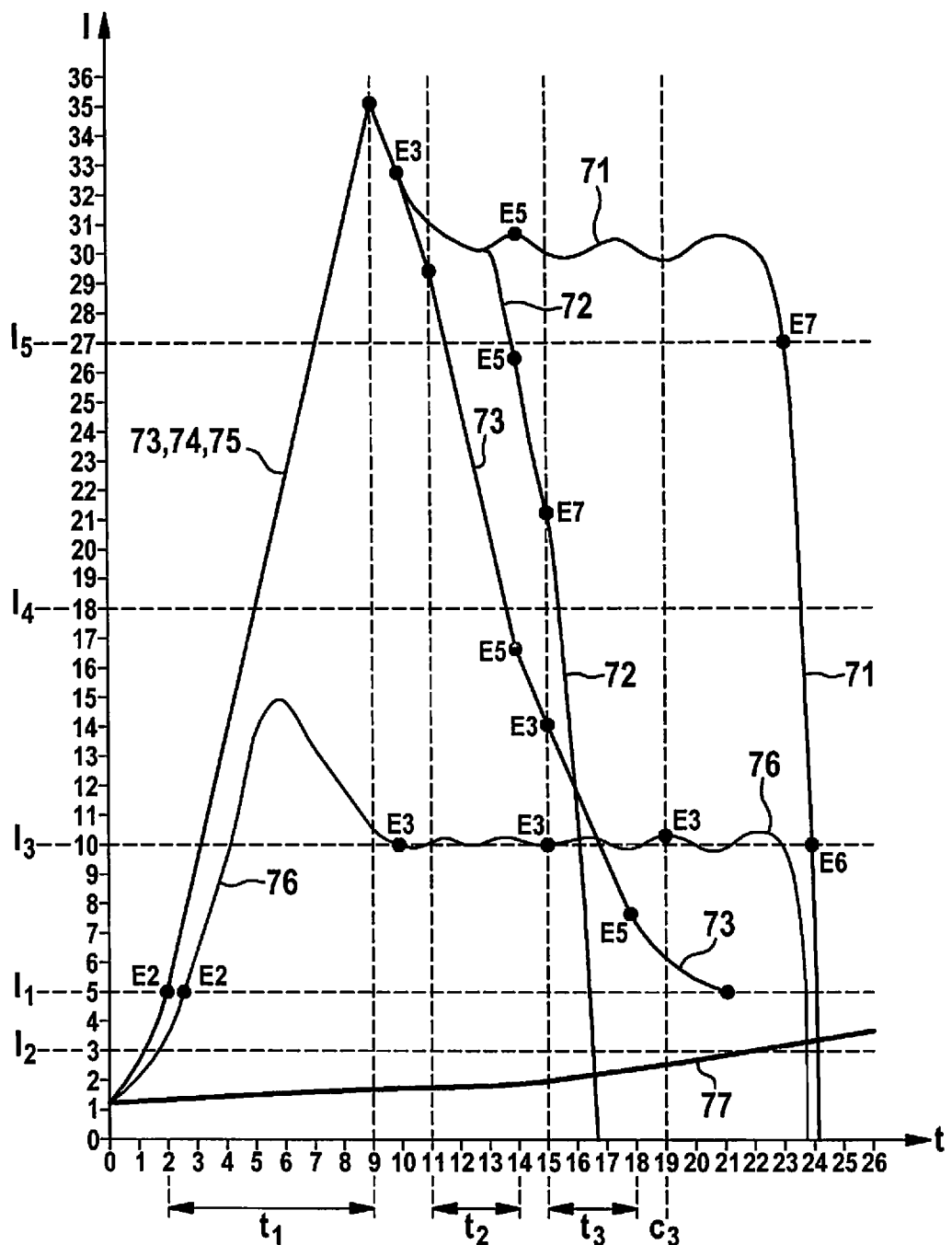
FIG. 12 is a diagram showing the current I over time t for various methods for automatically unscrewing a screw.

FIG. 12 is a diagram showing the current I over time t for various methods for automatically unscrewing a screw without completely disengaging the screw from the workpiece, which methods can be carried out in accordance with the program sequence of FIG. 11. A first characteristic curve 73 identifies the first operating situation. A second characteristic curve 74 identifies the second operating situation. A third characteristic curve 75 represents a third operating situation. For the embodiments selected, the first three characteristic curves 73, 74, 75 are configured identically in an initial phase. A fourth characteristic curve 76 represents a fourth operating situation. A fifth characteristic curve 77 represents a fifth operating situation.

The first limit value I1, second limit value I2, third limit value I3, fourth limit value I4, and fifth limit value I5 are also plotted on the diagram. Examples of the first time span t1, of the second time span t2, and of the third time span t3 are furthermore plotted. The first time span t1 can be, for example, between 0.03 and 0.1 second. The second time span t2 can be, for example, between 0.01 second and 0.05 second. The third time span t3 can be between 0.01 second and 0.05 second. In the example depicted, the first limit value I1 is lower than the third limit value I3. The third limit value I3 is lower than the fourth limit value I4. The fourth limit value I4 is lower than the fifth limit value I5. The second limit value I2 is lower than the first limit value I1.

In the characteristic curves, E2 depicts the occurrence of the query according to program point 830, as to whether the current exceeds the first limit value I1. Also illustrated, at E3, is the occurrence of the query according to program point 850 as to whether the current exceeds the third limit value I3. Additionally depicted, at E5, is the occurrence of the query according to program point 870 as to whether the current exceeds the fourth limit value I4. E6 represents, in the context of the first characteristic curve 71, the query according to program point 950 as to whether the absolute value of the negative time-related gradient of the current is greater than the negative time-related comparison gradient, i.e., whether the current is decreasing more steeply than the comparison gradient. Also illustrated, at E7, is the occurrence of the query according to program point 900 as to whether the current is below the fifth limit value I5.

The first operating situation corresponds to a load, i.e., to a high screw seating torque, and to a high desired rotation speed of the power tool. The second operating situation corresponds to a low load, i.e., to a low seating torque, and to a high desired rotation speed of the power tool. The third operating situation corresponds to no load, i.e., no seating torque, and to a high rotation speed of the power tool. The fourth operating situation corresponds to no substantial load, i.e., to no substantial seating torque, and to a low desired rotation speed that is, for example, less than 60% of the maximum rotation speed. The fifth operating situation corresponds to no substantial load, i.e., to no substantial seating torque, and to a low desired rotation speed of the power tool.

As is evident from the characteristic curves, the current profiles for the first operating situation, for the second operating situation, and for the third situation are identical in the initial phase. In the course of time, however, the current profiles for the first, second, and third operating situations become different with time. The current profiles for the fourth and the fifth operating situation are different from the outset.

What is claimed is:

1. A method for controlling an electric motor of a power tool having a receptacle for a tool for unscrewing a screw from a mating part, the method comprising:
   stopping the electric motor in the context of unscrewing a screw when a torque delivered by the electric motor decreases below a predefined limit value or when the screw has been unscrewed a predefined number of revolutions out of a seated position; and
   detecting the delivered torque on the basis of a current that is consumed by the electric motor, and the rotation speed of the electric motor being at least reduced when the current decreases below the predefined limit value.

2. The method as recited in claim 1, wherein at least one of the predefined limit value and the number of revolutions is specified by an operator.

3. The method as recited in claim 1, wherein the torque is ascertained on the basis of a change over time in the current that is consumed by the electric motor in the context of unscrewing the screw, and the rotation speed of the electric motor is at least reduced when the current decreases faster than a time-related comparison gradient.

4. The method as recited in claim 3, wherein at least one of the predefined limit value and the comparison gradient is specified as a function of a seating torque of the screw.

5. A method for controlling an electric motor of a power tool having a receptacle for a tool for unscrewing a screw from a mating part, comprising:
   detecting a seating torque of the screw; and
   performing different control methods for unscrewing the screw as a function of the seating torque of the screw,
   wherein the different control methods for unscrewing the screw are selected as a function of at least one of:
   i) a rotation speed of the electric motor predefined by an operator, and
   ii) an actuation speed of a switch for predefining the rotation speed.

6. The method as recited in claim 5, further comprising:
   applying control to the electric motor in a first phase in accordance with the rotation speed predefined by an operator;
   detecting a current of the electric motor during the first phase;
   comparing the detected current with a predefined limit value;
   upon exceedance of the predefined limit value, applying control to the electric motor during a subsequent second phase with a predefined second rotation speed, the predefined second rotation speed being a maximum rotation speed;
   detecting the current of the electric motor during the second phase; and
   recognizing a disengaged screw as a function of the detected current during the second phase and one of reducing the rotation speed of the electric motor or stopping the electric motor being stopped when the disengaged screw is recognized;
   wherein the predefined limit value depends on at least one of the seating torque and the rotation speed predefined by the operator.

7. The method as recited in claim 5, further comprising:
   applying control to the electric motor in a first phase in accordance with a rotation speed predefined by an operator;
   detecting a time span during which the electric motor remains in the first phase with aid of a counter;
   upon exceedance of a predefined time span, applying control to the electric motor during a subsequent second phase with a predefined second rotation speed, the predefined second rotation speed being a maximum rotation speed;
   detecting a current of the electric motor during the second phase;
   recognizing a disengaged screw as a function of the detected current of the electric motor during the second phase; and
   reducing the rotation speed of the electric motor or stopping the electric motor when the disengaged screw is recognized.

8. The method as recited in claim 5, wherein the seating torque of the screw is estimated on the basis of a current that is consumed by the electric motor in the context of unscrewing the screw in an initial phase.

9. A method for controlling an electric motor of a power tool having a receptacle for a tool for unscrewing a screw from a mating part, comprising:
   detecting a seating torque of the screw;
   performing different control methods for unscrewing the screw as a function of the seating torque of the screw,
   recognizing a disengaged screw as a function of at least one of: a current falling below a predefined limit value, and a predefined negative time-related gradient being exceeded; and
   when the disengaged screw is recognized, one of reducing a rotation speed of the electric motor, or stopping the electric motor.

\* \* \* \* \*